US012570307B2

(12) United States Patent　　　　(10) Patent No.: US 12,570,307 B2

Misumi et al.　　　　　　　　　　　　(45) Date of Patent: Mar. 10, 2026

(54) INFORMATION PROVIDING DEVICE AND INFORMATION PROVIDING METHOD

(71) Applicants:Nissan Motor Co., Ltd., Kanagawa (JP); RENAULT S.A.S., Boulogne-Billancourt (FR)

(72) Inventors: Ryuma Misumi, Kanagawa (JP); Masahide Nakamura, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 5 days.

(21) Appl. No.: 18/853,600

(22) PCT Filed: Mar. 17, 2023

(86) PCT No.: PCT/IB2023/000134

§ 371 (c)(1),
(2) Date: Oct. 2, 2024

(87) PCT Pub. No.: WO2023/194794

PCT Pub. Date: Oct. 12, 2023

(65) Prior Publication Data

US 2025/0236308 A1　　Jul. 24, 2025

(30) Foreign Application Priority Data

Apr. 5, 2022　(JP) ................................. 2022-062782

(51) Int. Cl.
*B60W 50/14* (2020.01)
*B60K 35/22* (2024.01)
(Continued)

(52) U.S. Cl.
CPC ............. *B60W 50/14* (2013.01); *B60K 35/22* (2024.01); *B60K 35/265* (2024.01); *B60K 35/28* (2024.01); *B60K 35/50* (2024.01); *B60K 35/60* (2024.01); *B60K 35/80* (2024.01); *B60K 35/90* (2024.01); *B60W 2050/146* (2013.01)

(58) Field of Classification Search
CPC . B60W 50/14; B60W 2050/146; B60K 35/28; B60K 35/80; B60K 35/50;
(Continued)

(56) References Cited

U.S. PATENT DOCUMENTS 9,057,623 B2 * 6/2015 Sempuku ............. G01C 21/367
2006/0195257 A1 * 8/2006 Nakamura ......... G01C 21/3632
701/437
(Continued)

FOREIGN PATENT DOCUMENTS

CN 110662683 A * 1/2020 ...... B60W 30/18163
CN 112399932 A * 2/2021 .............. H04W 4/46
(Continued)

*Primary Examiner* — Chico A Foxx
(74) *Attorney, Agent, or Firm* — Osha Bergman Watanabe & Burton LLP

(57) ABSTRACT

An information providing device includes an acquisition unit configured to acquire an intersection area on a travel route, the intersection area intersecting with an area in which another moving object can move; a recognition unit configured to recognize a travel environment around a vehicle; a determination unit configured to determine, based on the travel environment, whether or not the vehicle can pass through the intersection area; and a notification unit configured to notify an onboard terminal and/or an electronic terminal in the vehicle of a cause of the vehicle being unable to pass through the intersection area when the determination unit determines that the vehicle cannot pass through the intersection area. When notifying the cause using a display device, the notification unit lowers a contrast of a display portion of the intersection area relative to a display portion of the travel route and increases a degree of emphasizing a display portion of the cause.

10 Claims, 10 Drawing Sheets

(51) Int. Cl.
  *B60K 35/26*   (2024.01)
  *B60K 35/28*   (2024.01)
  *B60K 35/50*   (2024.01)
  *B60K 35/60*   (2024.01)
  *B60K 35/80*   (2024.01)
  *B60K 35/90*   (2024.01)

(58) Field of Classification Search
  CPC ...... B60K 35/60; B60K 35/22; B60K 35/265;
                 B60K 35/90
  See application file for complete search history.

(56)          References Cited

U.S. PATENT DOCUMENTS

2012/0323487 A1 *  12/2012  Sempuku .............. G09B 29/10
                                            701/428
2016/0176399 A1    6/2016  Takagi

FOREIGN PATENT DOCUMENTS

| | | | | | |
|---|---|---|---|---|---|
| CN | 112710321 | A | * | 4/2021 | ............. G01C 21/32 |
| CN | 110709911 | B | * | 1/2022 | ............. G08G 1/167 |
| CN | 115427274 | A | * | 12/2022 | ...... B60W 30/18163 |
| JP | H10267675 | A | * | 10/1998 | |
| JP | 2007206014 | A | * | 8/2007 | |
| JP | 2009259257 | A | * | 11/2009 | |
| JP | 2019-027996 | A | | 2/2019 | |
| WO | 2015/008588 | A1 | | 1/2015 | |
| WO | WO-2019012629 | A1 | * | 1/2019 | ............ H04W 4/024 |
| WO | WO-2019230272 | A1 | * | 12/2019 | ....... B60R 30/18163 |

\* cited by examiner

INFORMATION PROVIDING DEVICE AND INFORMATION PROVIDING METHOD

TECHNICAL FIELD

The present invention relates to an information providing device and an information providing method.

BACKGROUND ART

A display method is known, which is used when displaying a stop state of a vehicle having an automated driving function (Patent Document 1). This method includes detecting a surrounding situation of the vehicle. In the surrounding situation during the automated driving of the vehicle, when the vehicle will be in the stop state in the future, a display device is operated to display a stop display that extends upward from the road surface in the surrounding situation and that indicates the reason of stoppage of the vehicle.

PRIOR ART DOCUMENT

Patent Document

Patent Document 1: JP2019-27996A

SUMMARY OF INVENTION

Problems to be Solved by Invention

In the above conventional technique, reasons of stoppage notified to occupants of the vehicle are limited to those in accordance with traffic regulations, road signs, and state of traffic lights, so if the vehicle makes a stop due to different causes than traffic regulations, road signs, and state of traffic lights, such as a cause of an obstacle, the reason of stoppage is not notified to the occupants of the vehicle. The above conventional technique therefore has a problem in that the occupants of the vehicle may feel anxious because they have to wait until the start without being informed of the reason of stoppage.

A problem to be solved by the present invention is to provide an information providing device and an information providing method that are able to suppress the anxious feeling which is given to the occupants until the vehicle makes a start.

Means for Solving Problems

The present invention solves the above problem through acquiring, on a travel route that is set by autonomous travel control, an intersection area intersecting with an area in which another moving object can move, recognizing a travel environment around a vehicle, determining, based on the recognized travel environment, whether or not the vehicle can pass through the intersection area, notifying an onboard terminal and/or an electronic terminal in the vehicle of a cause of the vehicle being unable to pass through the intersection area when determining that the vehicle cannot pass through the intersection area, and when notifying the cause using a display device, lowering a contrast of a display portion of the intersection area relative to a display portion of the travel route and increasing a degree of emphasizing a display portion of the cause.

Effect of Invention

According to the present invention, it is possible to suppress the anxious feeling which is given to the occupants until the vehicle makes a start.

MODE(S) FOR CARRYING OUT THE INVENTION

Hereinafter, one or more embodiments of the present invention will be described with reference to the drawings. The following description is made on the assumption that vehicles travel on the left side in a country having a left-side traffic regulation. In countries having right-side traffic regulations, vehicles travel on the right side, so the left and right in the following description are to be read symmetrically.

\<Configuration of Driving Assistance System>

Figure 1:
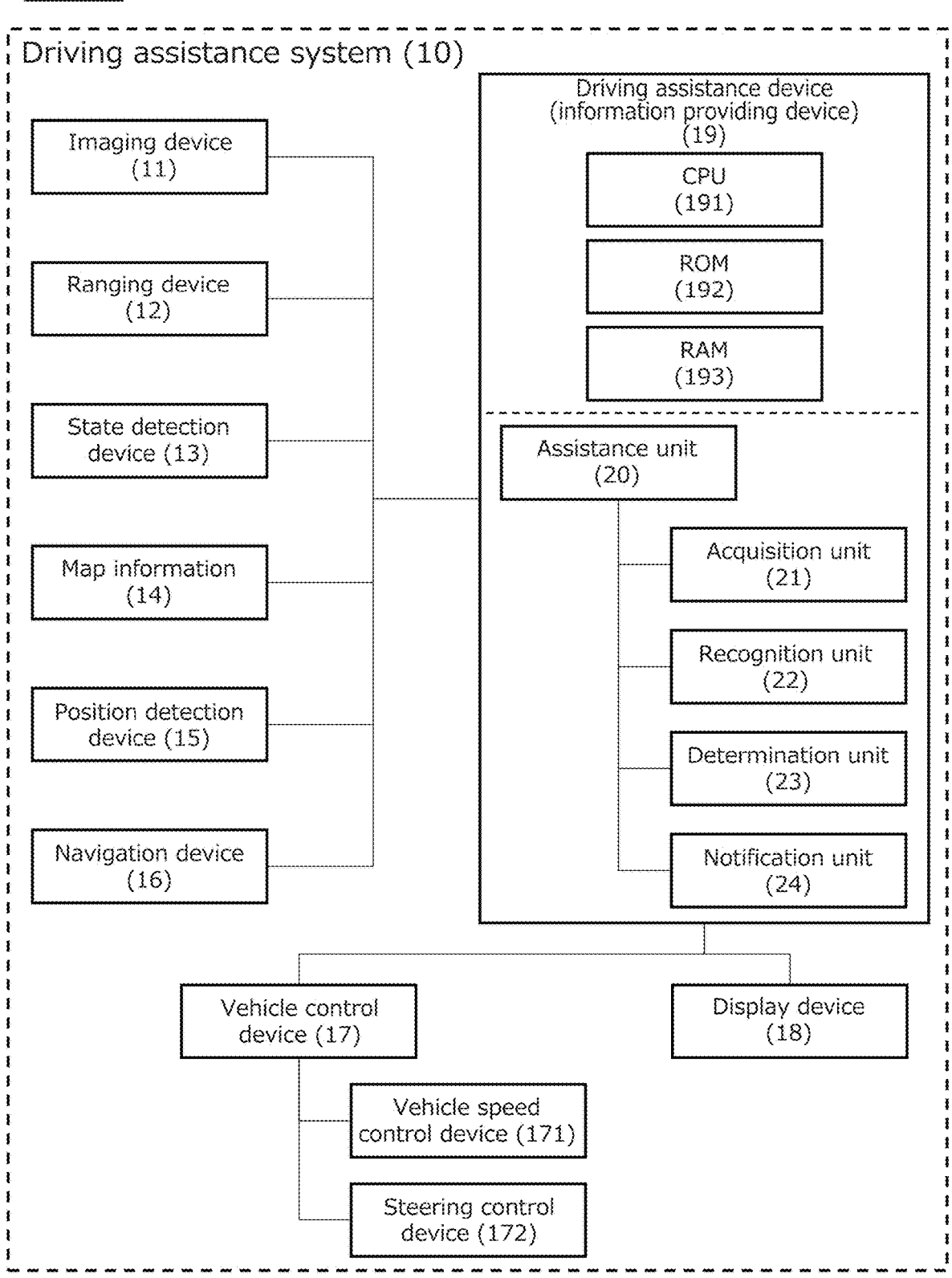
FIG. 1 is a block diagram illustrating an example of a driving assistance system including a driving assistance device according to the present invention.

FIG. 1 is a block diagram illustrating a driving assistance system 10 according to the present invention. The driving assistance system 10 is an onboard system and allows a vehicle to travel by autonomous travel control to a destination that is set by an occupant of the vehicle (occupants of the vehicle include the driver). The autonomous travel control refers to autonomously controlling the traveling operations of the vehicle using a driving assistance device, which will be described later. The traveling operations include all traveling operations such as acceleration, deceleration, starting, stopping, turning to the right or left, changing lanes, and pulling over. Autonomously controlling the traveling operations means that the driving assistance device controls the traveling operations using devices of the vehicle. That is, the driving assistance device intervenes and controls these traveling operations to a certain extent that is preliminarily determined. Traveling operations that do not require intervention are manually operated by the driver.

As illustrated in FIG. 1, the driving assistance system 10 includes an imaging device 11, a ranging device 12, a state detection device 13, map information 14, a position detection device 15, a navigation device 16, a vehicle control device 17, a display device 18, and a driving assistance device 19. In addition, as illustrated in FIG. 1, the driving assistance device 19 of the present embodiment includes, as a part thereof, an information providing device having an information providing function. The devices constituting the driving assistance system 10 are connected via a controller area network (CAN) or other onboard LAN and can exchange information with each other.

The imaging device 11 is a device that recognizes objects around the vehicle using images. The imaging device 11 may be, for example, one or more cameras such as cameras including CCDs or other imaging elements, ultrasonic cameras, or infrared cameras. Two or more imaging devices 11 can be provided in one vehicle. For example, such imaging devices 11 may be arranged in the front grille portion of the vehicle, below the right and left door mirrors, and near the rear bumper. This can reduce blind spots when recognizing objects around the vehicle.

The ranging device 12 is a device for calculating the relative distance and relative speed between the vehicle and an object. The ranging device 12 may be, for example, one or more radar devices or sonars, such as laser radars, millimeter wave radars, other similar radars (LRF and the like), light detection and ranging (LiDAR) units, and ultrasonic radars. Two or more ranging devices 12 can be provided in one vehicle. For example, such ranging devices 12 may be arranged at the front, right side, left side, and rear of the vehicle. This allows the relative distance and relative speed between the vehicle and a surrounding object to be calculated accurately.

Objects detected with the imaging device 11 and ranging device 12 are lane boundary lines of roads, center lines, road surface signs, median strips, guardrails, curbstones, highway side walls, road signs, traffic lights, crosswalks, construction sites, accident sites, traffic restrictions, etc. Objects also include obstacles that may affect the travel of the vehicle, such as automobiles (other vehicles) other than the subject vehicle, motorcycles (motorbikes), bicycles, and pedestrians. The detection results of the imaging device 11 and ranging device 12 are acquired by the driving assistance device 19 at predetermined time intervals as necessary.

The detection results of the imaging device 11 and ranging device 12 can be integrated or synthesized (so-called sensor fusion) by the driving assistance device 19. This can complement missing information about the detected objects. For example, the driving assistance device 19 can calculate the positional information of an object using the self-position information, which represents the position of the vehicle traveling, and the relative position (distance and direction) between the vehicle and the object. The self-position information is acquired by the position detection device 15. The calculated positional information of the object is integrated with multiple information items such as the detection results of the imaging device 11 and ranging device 12 and the map information 14 in the driving assistance device 19 and used as travel environmental information around the vehicle. Additionally or alternatively, the detection results of the imaging device 11 and ranging device 12 and the map information 14 can be used to recognize objects around the vehicle and predict their movements.

The state detection device 13 is a device for detecting the traveling state of the vehicle. Examples of the state detection device 13 include a vehicle speed sensor, an acceleration sensor, a yaw rate sensor (e.g., a gyro sensor), a steering angle sensor, and an inertial measurement unit. These devices are not particularly limited, and known devices can be used. The arrangement and number of these devices can be set as appropriate within a range in which the traveling state of the vehicle can be appropriately detected. The detection results of each device are acquired by the driving assistance device 19 at predetermined time intervals as necessary.

The map information 14 is information used for generation of a travel route, control of traveling operations, etc. and includes road information, facility information, and their attribute information. The road information and road attribute information include information on a road width, a radius of curvature of a road, a road shoulder structure, a road traffic regulation (speed limit, whether lane change is permitted), a merging point and a branching point of a road, a position at which the number of lanes increases/decreases, and other similar information. The map information 14 is high-definition map information that allows the movement trajectory for each lane to be perceived, and includes two-dimensional positional information and/or three-dimensional positional information at each map coordinate, road/lane boundary information at each map coordinate, road attribute information, lane inbound/outbound information, lane identification information, connection destination lane information, etc.

The road/lane boundary information of the high-definition map information is information that represents a boundary between the travel route on which the vehicle travels and another area. The travel route on which the vehicle travels refers to a road for the vehicle to travel, and the form of the travel route is not particularly limited. The boundary exists on each of the right and left sides with respect to the traveling direction of the vehicle, and the form of the boundary is not particularly limited. The boundary is, for example, a road mark or a road structure. Examples of road marks include lane boundary lines and center lines. Examples of road structures include median strips, guardrails, curbstones, tunnels, and highway side walls. At a point at which the travel route boundary cannot be clearly specified, such as inside an intersection, a boundary is preliminarily set on the travel route. This boundary is an imaginary boundary, rather than a road mark or a road structure that actually exists.

The map information 14 is stored in a readable state in a recording medium provided in the driving assistance device 19, an onboard device, or a server on a network. The driving assistance device 19 acquires the map information 14 as necessary.

The position detection device 15 is a positioning system for detecting the current position of the vehicle and is not particularly limited, and a known device can be used. The position detection device 15 calculates the current position of the vehicle, for example, from radio waves or the like received from satellites for a global positioning system (GPS). Additionally or alternatively, the position detection device 15 may estimate the current position of the vehicle from the vehicle speed information and acceleration information acquired from the vehicle speed sensor, the acceleration sensor, and the gyro sensor, which are each the state detection device 13, and cross-check the estimated current position with the map information 14 thereby to calculate the current position of the vehicle.

The navigation device 16 is a device that refers to the map information 14 to calculate a travel route from the current position of the vehicle detected by the position detection device 15 to a destination that is set by an occupant (occupants include the driver). The navigation device 16 uses the road information, facility information, etc. of the map information 14 to search for a travel route for the vehicle to reach the destination from the current position. The travel route includes at least information on the road on which the vehicle travels, the travel lane, and the traveling direction of the vehicle, and is displayed, for example, in a linear format. There may be two or more travel routes depending on the search conditions. The travel route calculated by the navigation device 16 is output to the driving assistance device 19.

The vehicle control device 17 is an onboard computer such as an electronic control unit (ECU) and electronically controls onboard equipment that is responsible for the travel of the vehicle. The vehicle control device 17 includes a vehicle speed control device 171 that controls the traveling speed of the vehicle, and a steering control device 172 that controls the steering operation of the vehicle. The vehicle speed control device 171 and the steering control device 172 autonomously control the operations of drive device and steering device in accordance with control signals that are input from the driving assistance device 19. This allows the vehicle to autonomously travel along the set travel route. Information necessary for autonomous control by the vehicle speed control device 171 and the steering control device 172, such as the traveling speed, acceleration, steering angle, and attitude of the vehicle, is acquired from the state detection device 13.

Examples of the drive device controlled by the vehicle speed control device 171 include an electric motor and/or an internal-combustion engine as the traveling drive sources, a power transmission device including a drive shaft and an automatic transmission that transmit the output of the traveling drive sources to the drive wheels, a drive device that controls the power transmission device, etc. The braking device controlled by the vehicle speed control device 171 is, for example, a braking device that brakes the wheels. Control signals corresponding to the set traveling speed are input to the vehicle speed control device 171 from the driving assistance device 19. The vehicle speed control device 171 generates signals for controlling these components of the drive device based on the control signals that are input from the driving assistance device 19, and transmits the signals to the drive device thereby to autonomously control the traveling speed of the vehicle.

On the other hand, the steering device controlled by the steering control device 172 is a steering device that controls the steered wheels in accordance with the steering angle of the steering wheel, and examples of the steering device include a steering actuator such as a motor attached to a column shaft of the steering wheel. The steering control device 172 autonomously controls the operation of the steering device based on the control signals input from the driving assistance device 19 so that the vehicle travels while maintaining a predetermined lateral position (position in the right-left direction of the vehicle) with respect to the set travel route. This control uses at least one of the detection results of the imaging device 11 and ranging device 12, the traveling state of the vehicle acquired with the state detection device 13, the map information 14, and the information on the current position of the vehicle acquired with the position detection device 15.

The display device 18 is a device for providing necessary information to the occupants of the vehicle. For example, the display device 18 is a liquid crystal display provided on an instrument panel or a projector such as a head-up display (HUD). The display device 18 may include an input device for an occupant of the vehicle to input instructions to the driving assistance device 19. Examples of the input device include a touch panel for inputting with a user's finger or a stylus pen, a microphone for acquiring voice instructions from the user, and a switch attached to the steering wheel of the vehicle. The display device 18 may include a speaker as an output device.

The driving assistance device 19 is a device for controlling the travel of the vehicle by controlling the devices constituting the driving assistance system 10 to cooperate with each other so that the vehicle travels to the set destination. The destination is set, for example, by an occupant of the vehicle. The driving assistance device 19 is, for example, a computer and includes a central processing unit (CPU) 191 that is a processor, a read only memory (ROM) 192 that stores programs, and a random access memory (RAM) 193 that serves as an accessible storage device. The CPU 191 is an operating circuit for achieving the functions of the driving assistance device 19 by executing the programs stored in the ROM 192.

The driving assistance device 19 has a driving assistance function of allowing the vehicle to travel to a set destination using autonomous travel control. In addition, the driving assistance device 19 of the present embodiment includes an information providing device as a part thereof. The information providing device has, as information providing functions, an intersection area acquisition function of acquiring an intersection area on a travel route, the intersection area intersecting with an area in which another moving object can move, a travel environment recognition function of recognizing a travel environment around the vehicle, a passage determination function of determining whether or not the vehicle can pass through the intersection area, and a notification function of notifying the vehicle occupants of whether or not the vehicle can pass through the intersection area. The programs stored in the ROM 192 include those for achieving these functions, and the CPU 191 executes the programs stored in the ROM 192 thereby to achieve these functions. In FIG. 1, functional blocks that achieve respective functions are extracted and illustrated for descriptive purposes.

\<Functions of Functional Blocks\>

The functions possessed by respective functional blocks of an assistance unit 20, an acquisition unit 21, a recognition unit 22, a determination unit 23, and a notification unit 24 illustrated in FIG. 1 will be described below with reference to FIGS. 2A to 2E.

Figure 2A:
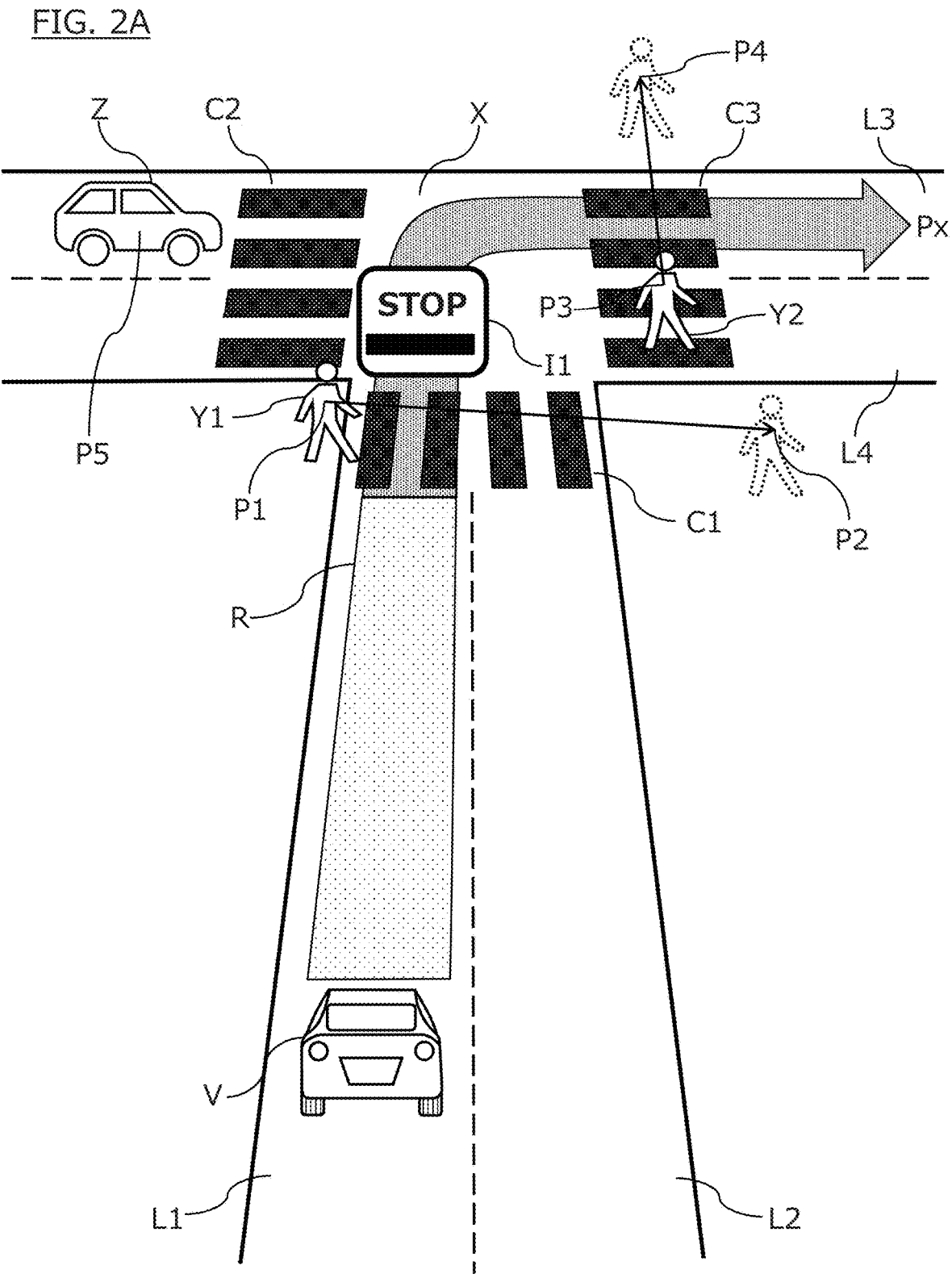
FIG. 2A is a diagram (part 1) illustrating an example of an image displayed when the driving assistance is executed by the driving assistance system illustrated in FIG. 1.

The assistance unit 20 has a driving assistance function of allowing the vehicle to travel to a set destination using the autonomous travel control. When executing driving assistance with the driving assistance function, the driving assistance device 19 uses the information providing function to display an image illustrating the travel environment of the vehicle on the display device 18. FIG. 2A is a diagram illustrating an example of an image displayed on the display device 18. The image illustrated in FIG. 2A is a bird's-eye view image acquired when setting a virtual viewpoint diagonally above behind a vehicle V and capturing an image ahead of the vehicle V from the viewpoint position. The bird's-eye view image is displayed with information, such as on the lanes and signs of the road on which the vehicle V travels, the traveling position of the vehicle V, and obstacles present around the vehicle V. In the following description, the vehicle V may also be referred to as a subject vehicle V in order to distinguish it from other vehicles.

The image illustrated in FIG. 2A is a two-dimensional image created by computer graphics (CG), but the image illustrating the travel environment of the vehicle V displayed on the display device 18 is not limited to this. For example, the image illustrating the travel environment may also be a three-dimensional image or an image acquired by the imaging device 11. In addition, an image created by CG may be superimposed on the image acquired by the imaging device 11.

The travel scene illustrated in FIG. 2A corresponds to an actual travel scene of the vehicle V. That is, in the travel scene illustrated in FIG. 2A, the vehicle Vis traveling on a road with one lane on each side. The traveling direction of vehicles in a lane L1 is from the lower side to upper side (from the near side to far side) of the drawing, and the traveling direction of vehicles in a lane L2 is from the upper side to lower side (from the far side to near side) of the drawing. The road on which the vehicle V is traveling intersects with a road with one lane on each side ahead of the vehicle V. On the road with one lane on each side, the traveling direction of vehicles in a lane L3 is from the left side to right side of the drawing, and the traveling direction of vehicles on a lane L4 is from the right side to left side of the drawing.

As illustrated in FIG. 2A, the area in which the two roads intersect is an intersection X. It is assumed that the intersection X illustrated in FIG. 2A is installed with no traffic lights. The intersection X is provided with a crosswalk C1 for pedestrians and bicycles to cross the road with the lanes L1 and L2 in the right-left direction of the drawing and crosswalks C2 and C3 for pedestrians and bicycles to cross the road with the lanes L3 and L4 in the up-down direction of the drawing. In the travel scene illustrated in FIG. 2A, it is assumed that vehicles traveling in the lane L1 can turn left or right at the intersection X, vehicles traveling in the lane L3 can travel straight ahead or turn right at the intersection X, and vehicles traveling in the lane L4 can travel straight ahead or turn left at the intersection X.

In the travel scene illustrated in FIG. 2A, it is assumed that a destination Px of the vehicle V is set by an occupant of the vehicle V at a position that can be reached after traveling straight ahead in the lane L3 to the right side of the drawing. In this case, the navigation device 16 uses the driving assistance function of the assistance unit 20 to set a travel route R of the vehicle V. For example, the navigation device 16 sets the travel route R illustrated in FIG. 2A. The travel route R is a route for traveling straight ahead in the lane L1, turning right at the intersection X, traveling in the lane L3, and arriving at the destination Px. In the travel scene illustrated in FIG. 2A, it is assumed that the vehicle V is traveling in the lane L1 along the travel route R as illustrated in FIG. 2A.

In the travel scene illustrated in FIG. 2A, it is assumed that a pedestrian Y1 at a position P1 moves by walking from the position P1 to a position P2 to cross the crosswalk C1, and a pedestrian Y2 at a position P3 moves by walking from the position P3 to a position P4 to cross the crosswalk C3. It is also assumed that another vehicle Z is stopped at a position P5 before the crosswalk C2 in the lane L3. In this case, the driving assistance device 19 uses its driving assistance function to execute the driving assistance to drive the vehicle V to the destination Px while providing appropriate information to the occupants of the vehicle by the information providing device, which is included as a part of the driving assistance device 19. This driving assistance including information provision is achieved mainly by the functions of the acquisition unit 21, recognition unit 22, determination unit 23, and notification unit 24.

The acquisition unit 21 has an intersection area acquisition function of acquiring an intersection area on the travel route R that is set by the autonomous travel control. The intersection area intersects with an area in which other moving objects can move. The other moving objects refer to traffic participants other than the vehicle V, such as other vehicles, motorcycles, bicycles, and pedestrians. The area in which other moving objects can move refers to an area in which traffic participants other than the vehicle V can move when moving from their current positions to their destinations. For example, the area in which pedestrians can move is an area in which pedestrians can walk, such as a sidewalk, a crosswalk, or a footbridge. The area in which other vehicles and motorcycles can move is an area of a road in which these can travel like the vehicle V.

The driving assistance device 19 uses the intersection area acquisition function of the acquisition unit 21 to acquire the travel route R from the navigation device 16. Then, the driving assistance device 19 acquires the intersection area on the travel route R. The intersection area intersects with an area in which other moving objects can move. The travel route R intersecting with an area in which other moving objects can move means that when a traffic participant other than the vehicle V is present in an area in which the traffic participant can move, if the vehicle V travels along the travel route R, the vehicle V and the other moving object will come into contact with each other. That is, in this situation, the travel route R of the vehicle V and the area in which the traffic participant other than the vehicle V can move are present on the same plane, and when viewed in a plane, the travel route R of the vehicle V overlaps with part or all of the area in which the traffic participant other than the vehicle V can move.

For example, when a crosswalk is present on the travel route R and a pedestrian is present on the crosswalk, if the vehicle V travels along the travel route R, the vehicle V will come into contact with the pedestrian. The crosswalk present on the travel route R is therefore an intersection area. In contrast, when a footbridge is present on the travel route R and a pedestrian is walking on the footbridge, even if the vehicle V travels along the travel route R, the vehicle V and the pedestrian will not come into contact with each other. This is because the road on which the vehicle V travels and the footbridge on which the pedestrian walks are not present on the same plane.

The map information 14 includes road information of the roads which the vehicle V passes through when traveling along the travel route R. The map information 14 also includes information on the areas in which traffic participants other than the vehicle V can move on the roads which the vehicle V passes through, and attributes of the areas. The driving assistance device 19 can therefore use the intersection area acquisition function of the acquisition unit 21 to extract the intersection areas present on the travel route R.

Specific examples of intersection areas include an intersection at which a road on which the vehicle V travels intersects with a road on which other vehicles than the vehicle V travel, and a crosswalk installed on a road on which the vehicle V travels. In addition, in a case in which the vehicle V enters a facility located at a position facing a road, when a sidewalk is provided between the roadway and the facility, the sidewalk facing the facility is an intersection area. That is, when a pedestrian is walking on the sidewalk between the facility and the roadway, if the vehicle V enters the facility, the vehicle V and the pedestrian will come into contact with each other, so the sidewalk is an intersection area.

In the travel scene illustrated in FIG. 2A, when another vehicle is present in the intersection X, if the vehicle V enters the intersection X, the vehicle V may come into contact with the other vehicle. The intersection X is therefore an intersection area. In addition, when the vehicle V enters the intersection X, if a pedestrian or a bicycle is crossing the crosswalk C1, the vehicle V may come into contact with the pedestrian or the bicycle. The crosswalk C1 is therefore an intersection area. Likewise, when the vehicle V turns left at the intersection X, the crosswalk C2 is an intersection area, while when the vehicle V turns right at the intersection X, the crosswalk C3 is an intersection area.

The recognition unit 22 has a travel environment recognition function of recognizing the travel environment around the vehicle V. The driving assistance device 19 uses the travel environment recognition function of the recognition unit 22 to recognize the travel environment of the vehicle V through acquiring the detection results of the imaging device 11 and ranging device 12 and performing processes such as pattern matching and sensor fusion on the acquired detection results. For example, the driving assistance device 19 detects another vehicle traveling around the vehicle V from the detection result of the imaging device 11 and detects, from the detection result of the ranging device 12, the distance from the vehicle V to the other vehicle and the direction in which the other vehicle is present relative to the vehicle V. The driving assistance device 19 thus recognizes the position of the other vehicle relative to the vehicle V. Additionally or alternatively, the driving assistance device 19 detects a pedestrian crossing the crosswalk ahead of the vehicle V from the detection result of the imaging device 11 and detects the distance from the vehicle V to the pedestrian from the detection result of the ranging device 12. The driving assistance device 19 thus recognizes the position of the pedestrian relative to the vehicle V.

The intersection X, which is an intersection area, may be installed with traffic lights. In order to recognize the state of the traffic lights as the travel environment, the driving assistance device 19 uses the travel environment recognition function of the recognition unit 22 to determine whether or not a traffic light is present ahead of the vehicle V from the detection result of the imaging device 11 and the map information 14. Then, when a determination is made that a traffic light is present ahead of the vehicle V, the driving assistance device 19 detects the state of the traffic light as the travel environment. The state of the traffic light is, for example, the state of lighting of the traffic light, and specific examples include a red light state of the traffic light (i.e., the vehicle V must make a stop before the intersection X), a yellow light state of the traffic light (i.e., the vehicle V cannot enter the intersection X except a case in which the vehicle V cannot make a stop), and a green light state of the traffic light (i.e., the vehicle V can enter the intersection X). The state of the traffic light is detected from the image acquired by the imaging device 11.

In the case of the travel scene illustrated in FIG. 2A, the driving assistance device 19 uses the travel environment recognition function of the recognition unit 22 to detect a preceding vehicle and a following vehicle traveling in the lane L1, an oncoming vehicle traveling in the lane L2, and vehicles traveling in the lane L3 and L4, for example, as other vehicles. Then, the driving assistance device 19 recognizes the positions of the other vehicles traveling around the vehicle V from the directions and distances of the other vehicles relative to the vehicle V. In the travel scene illustrated in FIG. 2A, the other vehicle Z which is stopped at the position P5 before the crosswalk C2 in the lane L3 is recognized as another vehicle traveling around the vehicle V.

In addition, the driving assistance device 19 detects pedestrians crossing the crosswalks C1, C2, and C3 and recognizes the presence of pedestrians as the travel environment of the vehicle V. In the travel scene illustrated in FIG. 2A, a pedestrian Y1 about to cross the crosswalk C1 and a pedestrian Y2 crossing the crosswalk C3 are detected, so the pedestrians Y1 and Y2 are recognized as pedestrians around the vehicle V. Furthermore, the driving assistance device 19 determines whether or not a traffic light is installed at the intersection X. In the travel scene illustrated in FIG. 2A, no traffic light is installed at the intersection X, so the driving assistance device 19 recognizes that no traffic light is present at the intersection X.

The determination unit 23 has a passage determination function of determining, based on the travel environment of the vehicle V recognized by the travel environment recognition function, whether or not the vehicle V can pass through the intersection area. The driving assistance device 19 uses the passage determination function of the determination unit 23 to determine whether or not an obstacle is present in the intersection area, and when determining that no obstacle is present in the intersection area, the driving assistance device 19 determines that the vehicle V can pass through the intersection area. On the other hand, when determining that an obstacle is present in the intersection area, the driving assistance device 19 determines that the vehicle V cannot pass through the intersection area.

In addition to this, the driving assistance device 19 uses the passage determination function of the determination unit 23 to determine whether or not a traffic light is installed in the intersection area (specifically, at the intersection X). The driving assistance device 19 acquires the positional information of a traffic light, for example, from the map information 14 and crosschecks the position of the intersection area with the position of the traffic light to determine whether or not a traffic light is installed in the intersection area. Then, when determining that a traffic light is installed in the intersection area (specifically, at the intersection X), the driving assistance device 19 determines whether or not the state of the traffic light is a state of instructing to make a stop. When determining that the state of the traffic light is a state of instructing to make a stop (i.e., the red light state), the driving assistance device 19 determines that the vehicle V cannot pass through the intersection area, while when determining that the state of the traffic light is not a state of instructing to make a stop (i.e., the green light state), the driving assistance device 19 determines that the vehicle V can pass through the intersection area.

As for the yellow light state, the driving assistance device 19 determines, based on the traveling state of the vehicle V (particularly the traveling speed of the vehicle V) and the distance from the vehicle V to the intersection area (intersection X), whether or not the vehicle V can make a stop before the intersection X. When determining that the vehicle V cannot make a stop before the intersection X, the driving assistance device 19 determines that the state of the traffic light is not a state of instructing to make a stop and that the vehicle V can pass through the intersection area (intersection X). On the other hand, when determining that the vehicle V can make a stop before the intersection area (intersection X), the driving assistance device 19 determines that the state of the traffic light is a state of instructing to make a stop and that the vehicle V cannot pass through the intersection area.

Thus, such as in the case of an intersection installed with traffic lights, provided that it is necessary to determine the presence or absence of an obstacle in the intersection area and the state of the traffic lights, when determining that no obstacle is present in the intersection area and the state of the traffic lights is not a state of instructing to make a stop, the driving assistance device 19 determines that the vehicle V can pass through the intersection area. In contrast, when determining that an obstacle is present in the intersection area or when determining that the state of the traffic lights is a state of instructing to make a stop, the driving assistance device 19 determines that the vehicle V cannot pass through the intersection area. The determination of the presence or absence of an obstacle in the intersection area and the determination of the state of traffic lights may be performed simultaneously, or the state of traffic lights may be determined first and then the presence or absence of an obstacle in the intersection area may be determined.

As described above, in the travel scene illustrated in FIG. 2A, the driving assistance device 19 recognizes that the intersection X and the crosswalks C1, C2, and C3 are intersection areas and that no traffic light is installed at the intersection X. In the travel scene illustrated in FIG. 2A, since no traffic light is installed at the intersection X, the driving assistance device 19 determines the presence or absence of obstacles at the intersection X and the crosswalks C1, C2, and C3.

Regarding the presence or absence of obstacles, as described above, in the travel scene illustrated in FIG. 2A, the driving assistance device 19 recognizes that the other vehicle Z stopped at the position P5 before the crosswalk C2 in the lane L3, the pedestrian Y1 about to cross the crosswalk C1, and the pedestrian Y2 crossing the crosswalk C3 are present. On the basis of this recognition, the driving assistance device 19 determines that the pedestrians Y1 and Y2 are present at the crosswalks C1 and C3, respectively, and that the vehicle V cannot pass through the crosswalks C1 and C3. The driving assistance device 19 also determines that there is a possibility that the other vehicle Z stopped will enter the crosswalks C1 to C3 and the intersection X. In the travel scene illustrated in FIG. 2A, therefore, the driving assistance device 19 determines that the vehicle V cannot pass through the intersection areas.

In addition, the driving assistance device 19 uses the passage determination function of the determination unit 23 to determine whether or not two or more intersection areas are present at one point. Two or more intersection areas being present at one point means, for example, that two or more intersection areas are present adjacent to each other. Specifically, as in the travel scene illustrated in FIG. 2A, when the crosswalks C1 to C3 are provided at the intersection X, the driving assistance device 19 determines that two or more intersection areas are present at one point. On the other hand, when only one crosswalk is provided at a position that is not an intersection of roads, no intersection area is present adjacent to the crosswalk which is an intersection area, so a determination is made that two or more intersection areas are not present at one point. Examples of points at which two or more intersection areas are not present (i.e., only one intersection area is present) include a point at which a crosswalk is provided in front of a facility facing a road for the convenience of facility users.

The notification unit 24 has a function of notifying an onboard terminal and/or an electronic terminal in the vehicle V as to whether or not the vehicle V can pass through an intersection area. The onboard terminal and electronic terminal of the vehicle V are represented, for example, by the display device 18, but are not limited to this, and examples thereof include a display portion of the instrument panel, a terminal for providing information to the occupants of the vehicle V when executing the driving assistance at the above-described assistance level 3 or 4, etc. The driving assistance device 19 uses the notification function of the notification unit 24 with the onboard terminal and/or electronic terminal in the vehicle V to notify the occupants of the vehicle V as to whether or not the vehicle V can pass through an intersection area. In addition, while the vehicle V is traveling from its current position to the intersection area, the driving assistance device 19 repeatedly performs the process of passage determination using the passage determination function. Then, the driving assistance device 19 changes the information provided to the onboard terminal and/or electronic terminal in the vehicle V (i.e., the occupants of the vehicle V) in accordance with the obtained determination results.

Specific examples of the information provided to the occupants of the vehicle V include information indicating whether or not an obstacle is present in the intersection area, information indicating the type of obstacle (i.e., traffic participant) present in the intersection area, information indicating the lighting state of traffic lights installed in the intersection area, and information indicating whether or not the vehicle V can pass through the intersection area. These information items are displayed on the display device 18 to display them to the occupants of the vehicle V, but instead of this, they may be output as a voice message from a speaker provided in the display device 18. For example, when the vehicle V is approaching an intersection area, the occupants are notified that the vehicle is approaching an intersection area by a voice message such as "You will reach an intersection soon." In addition to this, when the vehicle V can pass through the intersection area, the occupants are notified by a voice message, such as "You can pass through the intersection ahead as is." A recorded voice message or synthetic voice message may be used for the voice message.

These information items may be displayed together with the distance from the vehicle V to the intersection area. Alternatively or in addition to this, these information items may be displayed at the position of the intersection area on the travel route R displayed on the display device 18. Alternatively or in addition to this, these information items may be displayed by superimposing them on an image of the outside of the vehicle acquired from the imaging device 11. The display device 18 on which these information items are displayed includes not only a display equipped in the vehicle V but also a display of a terminal possessed by an occupant of the vehicle V. In the case of an unmanned taxi or the like in which the driving assistance device 19 executes all driving tasks of the vehicle V and a supervisor monitors the travel of the vehicle V at a remote location away from the vehicle V, the above-described information may be displayed on a display provided on a terminal for monitoring the travel of the vehicle V.

In the travel scene illustrated in FIG. 2A, as described above, the driving assistance device 19 determines that the vehicle V cannot pass through the crosswalk C1 because the pedestrian Y1 is present. On the basis of this determination result, the driving assistance device 19 uses the notification function of the notification unit 24 to notify the occupants of the vehicle V that the vehicle V cannot pass through the crosswalk C1 and will therefore make a stop before the crosswalk C1. The driving assistance device 19 notifies the occupants that the vehicle V will make a stop before the crosswalk C1, for example, by changing the color of the display portion of the travel route R displayed on the display device 18. On the travel route R illustrated in FIG. 2A, as an example, a portion of the display portion of the travel route R up to the crosswalk C1 is lightly hatched as a travelable portion, and the crosswalk C1 and a portion beyond the crosswalk C1 are darkly hatched as untravelable portions.

In addition to this, the driving assistance device 19 displays an image (icon) I1 with "STOP" written on it as illustrated in FIG. 2A on the display device 18 to notify the occupants that the vehicle V will make a stop before the crosswalk C1. The position at which the image I1 is displayed is the position of the intersection X on the travel route R displayed on the display device 18. Alternatively or in addition to this, the driving assistance device 19 outputs a voice message from the speaker of the display device 18 saying "The vehicle will make a stop before the crosswalk ahead." to notify the occupants that the vehicle V will make a stop before the crosswalk C1.

After notifying the occupants that the vehicle V will make a stop before the crosswalk C1 by the above-described display and voice message, the driving assistance device 19 uses the driving assistance function of the assistance unit 20 to drive the vehicle V along the travel route R. Specifically, the traveling speed of the vehicle V is controlled via the vehicle speed control device 171 of the vehicle control device 17 to stop the vehicle V before the crosswalk C1. During this operation, control of the steering wheel of the vehicle V is also executed by the steering control device 172.

Figure 2B:
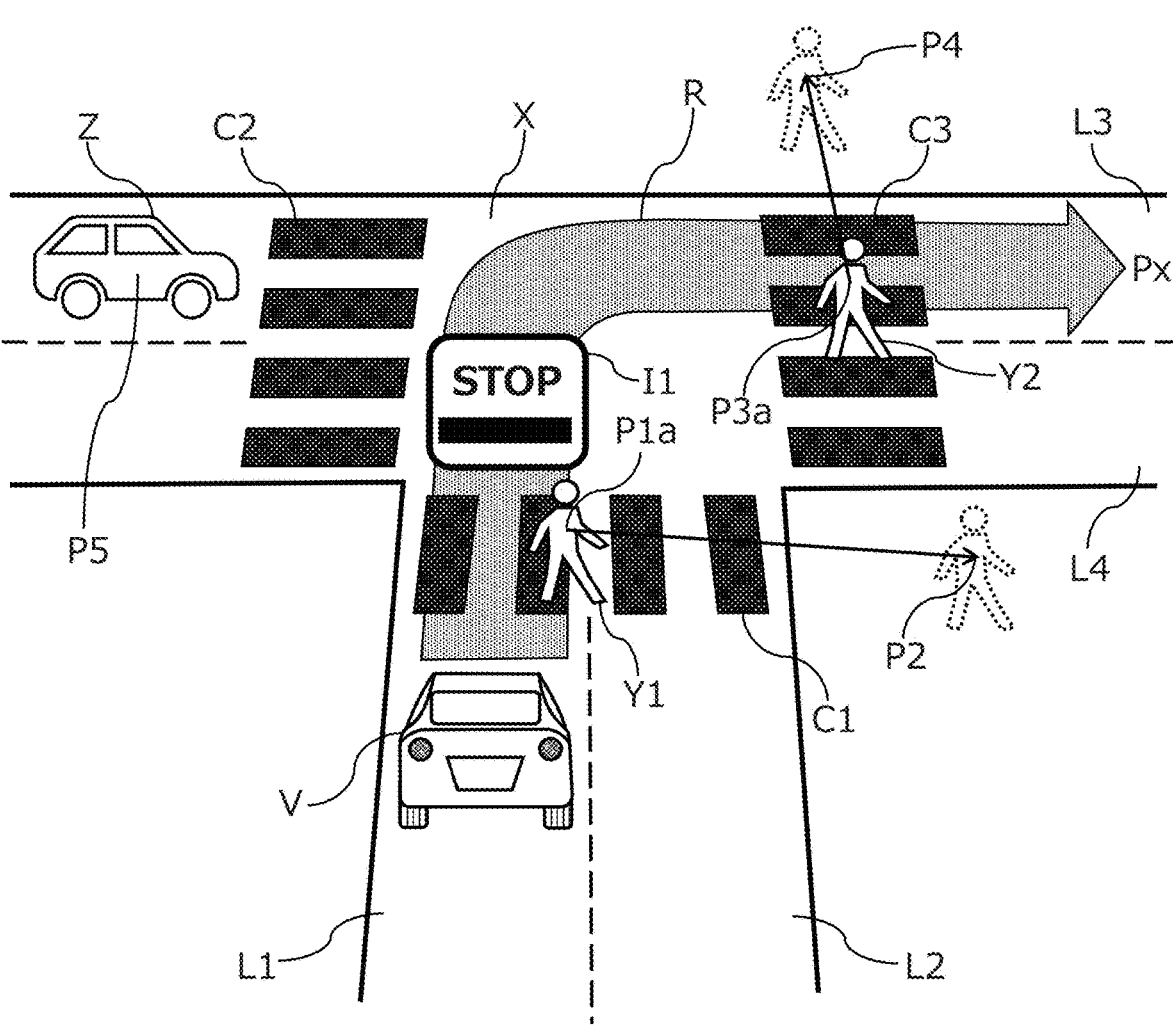
FIG. 2B is a diagram (part 2) illustrating an example of an image displayed when the driving assistance is executed by the driving assistance system illustrated in FIG. 1.

FIG. 2B illustrates an example of an image displayed on the display device 18 when the vehicle V makes a stop before the crosswalk C1. In the travel scene illustrated in FIG. 2B, the pedestrian Y1 is walking at a position P1a on the crosswalk C1 toward the position P2. The pedestrian Y2 is also walking at a position P3a on the crosswalk C3 toward the position P4. The driving assistance device 19 recognizes the positions of the pedestrians Y1 and Y2 from the detection results of the imaging device 11 and ranging device 12. Then, the driving assistance device 19 determines that the vehicle V cannot pass through the crosswalks C1 and C3 because the pedestrians Y1 and Y2 are present on the crosswalks C1 and C3, respectively: The driving assistance device 19 controls the travel operation of the vehicle V via the vehicle control device 17 so as to maintain the stop state of the vehicle V.

In addition, in the travel scene illustrated in FIG. 2B, the other vehicle Z is stopped at the position P5 in the lane L3. The driving assistance device 19 recognizes the other vehicle Z stopped at the position P5 and infers a cause of the other vehicle Z continuing to be stopped at the same position P5 in the travel scene illustrated in FIG. 2B as in the travel scene illustrated in FIG. 2A. In the travel scene illustrated in FIG. 2B, the driving assistance device 19 infers that the other vehicle Z is stopped before the crosswalk C2 to avoid stoppage in the intersection X. If the other vehicle Z travels straight through the intersection X, it will make a stop before the crosswalk C3 to avoid contact with the pedestrian Y2, while if the other vehicle Z turns right at the intersection X, it will make a stop before the crosswalk C1 to avoid contact with the pedestrian Y1. In other words, the other vehicle Z will make a stop in the intersection X whether it travels straight ahead or turns right, thus resulting in the above inference.

Figure 2C:
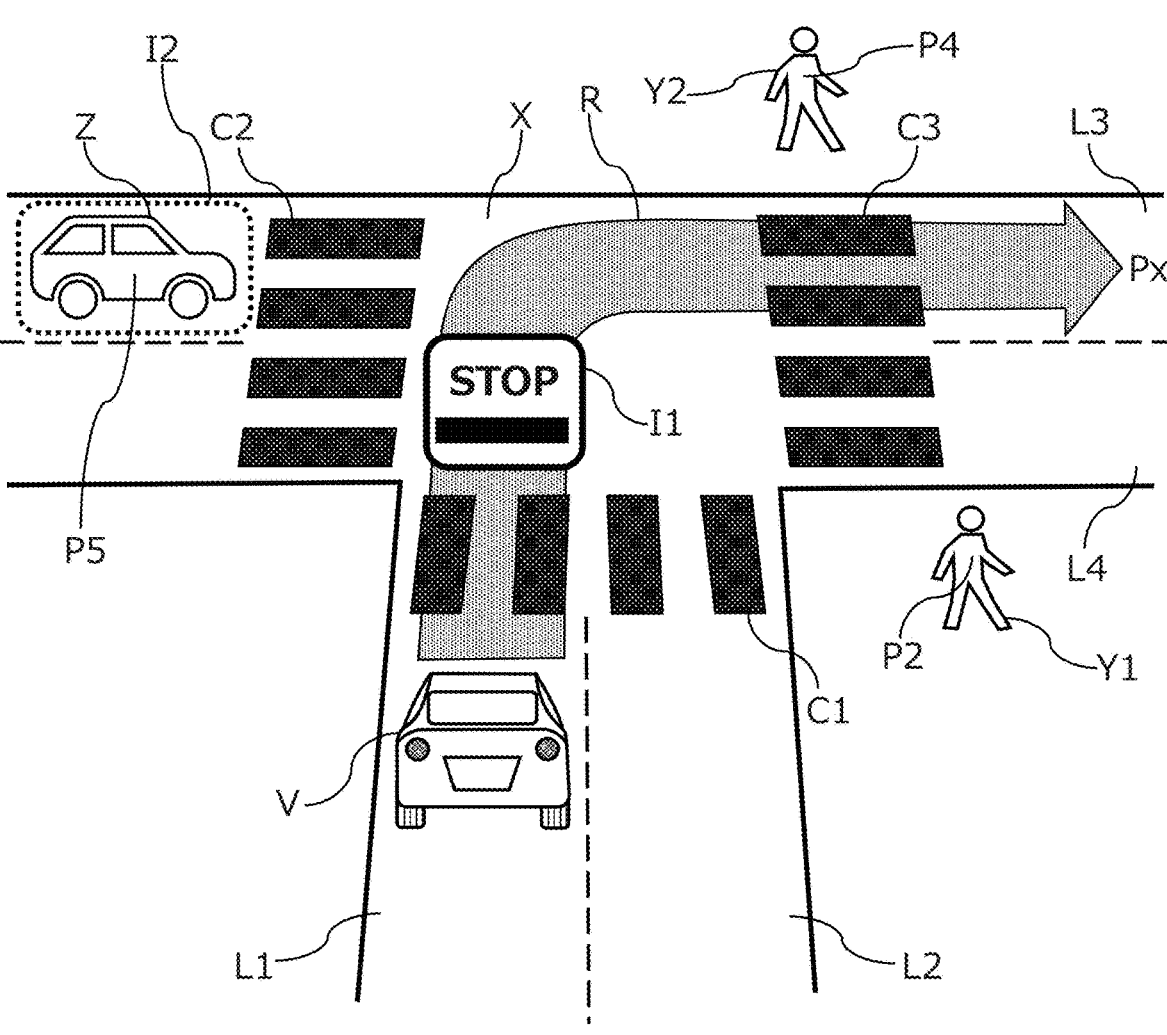
FIG. 2C is a diagram (part 3) illustrating an example of an image displayed when the driving assistance is executed by the driving assistance system illustrated in FIG. 1.

FIG. 2C illustrates an example of an image displayed on the display device 18 after the vehicle V makes a stop before the crosswalk C1 and then the pedestrians Y1 and Y2 finish crossing the crosswalks C1 and C3, respectively. In the travel scene illustrated in FIG. 2C, the pedestrian Y1 is walking at the position P2, and the pedestrian Y2 is walking at the position P4. The driving assistance device 19 recognizes the positions of the pedestrians Y1 and Y2 from the detection results of the imaging device 11 and ranging device 12. The driving assistance device 19 then determines that the vehicle V can pass through the crosswalks C1 and C3 because no obstacles are present on the crosswalks C1 and C3.

In addition, in the travel scene illustrated in FIG. 2C, the other vehicle Z is stopped at the position P5 in the lane L3. The driving assistance device 19 recognizes the other vehicle Z stopped at the position P5 and determines whether or not the other vehicle Z makes a start and enters the intersection X in the travel scene illustrated in FIG. 2C. In the travel scene illustrated in FIG. 2B, the driving assistance device 19 infers that the other vehicle Z has to make a stop in the intersection X in order to avoid contact with the pedestrian Y1 or Y2 and therefore has made a stop before the crosswalk C2. In the travel scene illustrated in FIG. 2C, the pedestrians Y1 and Y2 have finished crossing the crosswalks, and the other vehicle Z does not have to make a stop in the intersection X in order to avoid contact with the pedestrian Y1 or Y2. The driving assistance device 19 therefore determines that the other vehicle Z will make a start and enter the intersection X. In contrast, if an obstacle other than the pedestrians Y1 and Y2 is present at any of the intersection X and the crosswalks C1 to C3, the driving assistance device 19 determines that the other vehicle Z will continue to be stopped before the crosswalk C2.

In the travel scene illustrated in FIG. 2C, as described above, the driving assistance device 19 autonomously controls the travel operation of the vehicle V via the vehicle control device 17 so that the vehicle V makes a start after the other vehicle Z has passed through the intersection X. This is to reliably avoid contact between the vehicle V and the other vehicle Z. In the travel scene illustrated in FIG. 2C, however, the occupants of the vehicle V expect that the vehicle V will make a start once the pedestrians Y1 and Y2 have finished crossing the crosswalks. This is because no traffic light is installed at the intersection X illustrated in FIG. 2C, and if no obstacle is present at the intersection X or the crosswalk C1 or C3 on the travel route R of the vehicle V, the occupants of the vehicle V think that the vehicle V can pass through the intersection X. In particular, in the travel scene illustrated in FIG. 2C, the occupants of the vehicle V are in a state of waiting in the vehicle V for the vehicle V to make a start while the pedestrian Y1 is moving on foot from the position P1a to the position P2 illustrated in FIG. 2B and the pedestrian Y2 is moving on foot from the position P3a to the position P4 illustrated in FIG. 2B. The occupants of the vehicle V therefore has a stronger expectation that the vehicle V will make a start once the pedestrians Y1 and Y2 have finished crossing the crosswalks.

In the travel scene illustrated in FIG. 2C, however, even after the pedestrians Y1 and Y2 have finished crossing the crosswalks, the image I1 notifying the occupants of stoppage of the vehicle V remains displayed on the display device 18, and the vehicle V continues to stop. This is because, as described above, the driving assistance device 19 determines that the other vehicle Z will enter the intersection X. and performs control to allow the vehicle V to make a start after the other vehicle Z has passed through the intersection X. In this case, the occupants of the vehicle V may feel anxious that the autonomous travel control by the driving assistance device 19 is not being executed properly, resulting in the stoppage of the vehicle V, because the vehicle V continues to stop contrary to their expectations. In particular, at a location such as the intersection X illustrated in FIG. 2C, at which no traffic light is installed and the crosswalks C1 to C3 are present in addition to the intersection X, it is necessary to determine whether or not two or more intersection areas are passable in a relatively short time. This is because the vehicle V cannot make a start unless all intersection areas are determined to be passable. In the travel scene such as that illustrated in FIG. 2C, therefore, it is difficult for the occupants of the vehicle V to intuitively perceive the cause of stoppage of the vehicle V. and the occupants are likely to feel anxious. In addition, the start of the vehicle V will be delayed, such as when the start of the other vehicle Z is delayed or when the other vehicle Z is a parked vehicle, and the occupants of the vehicle V may feel anxious.

In this context, to suppress the anxious feeling given to the occupants, the notification unit 24 of the present embodiment has a function of notifying the occupants of the vehicle V of a cause of the vehicle V being unable to pass through the intersection area when the determination unit 23 determines that the vehicle V cannot pass through the intersection area and the stoppage time of the vehicle V is longer than a predetermined time. When using the passage determination function of the determination unit 23 to determine that the vehicle V cannot pass through the intersection area, the driving assistance device 19 uses the notification function of the notification unit 24 to acquire the stoppage time of the vehicle V. Then, when the stoppage time of the vehicle V is longer than a predetermined time, the driving assistance device 19 notifies the occupants of the vehicle V of the cause of the vehicle V being unable to pass through the intersection area. On the other hand, when the stoppage time of the vehicle V is equal to or shorter than the predetermined time, the occupants of the vehicle V are not notified of the cause of the vehicle V being unable to pass through the intersection area.

The stoppage time of the vehicle V refers to a time that has elapsed since the vehicle V has stopped before an intersection area that is determined to be impassable. The vehicle V being stopped is determined, for example, based on the traveling speed of the vehicle V acquired from the state detection device 13 and the positional information of the vehicle V acquired from the position detection device 15. Specifically, when the traveling speed of the vehicle V acquired from the state detection device 13 is 0 km/h and the positional information of the vehicle V acquired from the position detection device 15 is not changed, the vehicle V is determined to be stopped. The driving assistance device 19 uses the driving assistance function of the assistance unit 20 to store in the RAM 193 or the like the point of time when the vehicle V is determined to be stopped. Then, as necessary; the time that has elapsed since the point of time when the vehicle V is determined to be stopped is acquired as the stoppage time.

The predetermined time, which is the criterion for notifying the cause of stoppage, can be set to an appropriate value within a range in which the occupants of the vehicle V do not feel anxious when the cause of stoppage of the vehicle V cannot be perceived. For example, the predetermined time is set as a period of time during which the state of a traffic light is a general state instructing to make a stop (i.e., the red light state). Alternatively, the stoppage time required to pass through each intersection is recorded, and the average value of the stoppage times recorded for each intersection is set as the predetermined time. Alternatively, the time during which the occupants can wait to make a start without feeling anxious is preliminarily determined by experiment, and the stoppage time determined from the experiment is set as the predetermined time.

The cause of the vehicle V being unable to pass through an intersection area refers to another moving object that is present in an intersection area for which a determination is made that the vehicle cannot pass through. Examples thereof include bicycles and pedestrians walking on crosswalks and other vehicles and motorcycles present in intersections.

In the travel scene illustrated in FIG. 2C, it is assumed that a predetermined time has elapsed since the vehicle V has stopped in the travel scene illustrated in FIG. 2B. In this case, the driving assistance device 19 uses the passage determination function of the determination unit 23 to determine that the vehicle V cannot pass through the crosswalk C1, and therefore uses the notification function of the notification unit 24 to obtain the stoppage time of the vehicle V. Then, the stoppage time of the vehicle V has already exceeded the predetermined time, so the driving assistance device 19 notifies the occupants of the vehicle V that the other vehicle Z is the cause of the vehicle V being unable to pass the intersection X. This is because, as described above, the driving assistance device 19 determines that the other vehicle Z has made a start and is entering the intersection X.

When using the notification function of the notification unit 24 to notify the cause of the vehicle V being unable to pass through the intersection area, for example, as illustrated in FIG. 2C, the driving assistance device 19 displays the display portion of the other vehicle Z with a dashed rectangular image I2 in an emphasized manner. Thus, when using the display device 18 to notify the cause of the vehicle V being unable to pass through the intersection area, the driving assistance device 19 changes the color of the display portion of the cause to emphasize it. Alternatively or in addition to this, the driving assistance device 19 surrounds the display portion of the cause with a rectangular or circular image. Alternatively or in addition to this, the driving assistance device 19 outputs a voice message from the speaker of the display device 18 saying. "Stopping due to another vehicle Z ahead on the left." to notify the occupants of the cause of stoppage. When changing the color of the display portion of the cause, the driving assistance device 19 changes the color from the original color to a more attention-grabbing color (e.g., red).

When notifying the cause of the vehicle V being unable to pass through the intersection X, the driving assistance device 19 continues notification of the cause until determining that the vehicle V can pass through the intersection area. In the travel scene illustrated in FIG. 2C, the other vehicle Z is displayed with an increased degree of emphasis by the image I2 until a determination is made that the other vehicle Z has passed through the intersection X and the vehicle V can enter the intersection X. In addition, when there are two or more causes of the vehicle V being unable to pass through intersection areas, a determination is made for each cause as to whether or not the vehicle V can pass through the intersection area, and notification of each cause is continued in accordance with the determination result for each cause. For example, in the travel scene illustrated in FIG. 2C, when the pedestrian Y1 and the other vehicle Z are causes of the vehicle V being unable to pass through the intersection X, a determination is made whether or not each of the pedestrian Y1 and the other vehicle Z will be an obstacle when the vehicle V enters the intersection X. Then, while a determination is made that the pedestrian Y1 and the other vehicle Z are causes of the vehicle V being unable to pass through the intersection X, they are continued to be displayed in an emphasized manner. After that, when a determination is made that the pedestrian Y1 is not an obstacle when the vehicle V enters the intersection X and only the other vehicle Z is a cause of the vehicle V being unable to pass through the intersection X, the display of the pedestrian Y1 is returned to normal one, and only the other vehicle Z is continued to be displayed in an emphasized manner.

In addition, when using the notification function of the notification unit 24 to notify the cause of the vehicle V being unable to pass through the intersection area, the driving assistance device 19 lowers the contrast of a portion ahead of the intersection area in the display portion of the travel route R relative to a display portion around the travel route. Alternatively or in addition to this, the driving assistance device 19 increases the contrast of the display portion of the intersection area relative to the display portion of the travel route R. Alternatively or in addition to this, the driving assistance device 19 increases the degree of emphasizing the display portion of the intersection area. For example, in the travel scene illustrated in FIG. 2C, the driving assistance device 19 lowers the contrast of a portion ahead of the crosswalk C3 in the display portion of the travel route R relative to the display portion of the lane L3. Alternatively or in addition to this, the driving assistance device 19 increases the contrast of the display portions of the crosswalks C1 and C3 and intersection X relative to the travel route R and increases the degree of emphasis by surrounding them with rectangular images.

More specifically, the driving assistance device 19 lowers the contrast of the display portion of the intersection area relative to the display portion of the travel route R and increases the degree of emphasizing the display portion of the cause of the vehicle V being unable to pass through the intersection area. For example, in the travel scene illustrated in FIG. 2C, the driving assistance device 19 lowers the contrast of the display portions of the crosswalks C1 and C3 and intersection X relative to the display portion of the travel route R while increasing the degree of emphasizing the other vehicle Z with the image I2. This allows the cause of the vehicle V being unable to pass through the intersection areas to be displayed in a further emphasized manner.

In order to suppress the uncomfortable feeling given to the occupants of the vehicle V due to an overemphasized display of the cause, when determining that the vehicle V cannot pass through the intersection area, the driving assistance device 19 may start notification of the cause from a point of time when the stoppage time of the vehicle V exceeds a predetermined time. In addition, when the cause is an obstacle such as the other vehicle Z, the drive assistance device 19 uses the travel environment recognition function of the recognition unit 22 to classify obstacles into stationary obstacles and other obstacles. Then, the driving assistance device 19 may notify the stationary obstacles and the other obstacles in different forms. The stationary obstacles refer to those that are installed in place and do not move by themselves. When a stationary obstacle is the cause of stoppage, the vehicle V cannot continue traveling along the travel route R unless it avoids the stationary obstacle, so the driving assistance device 19 displays the stationary obstacle in a different form from other obstacles, thereby prompting the occupants of the vehicle V, etc. to perform an operation to avoid the obstacle.

Figure 2D:
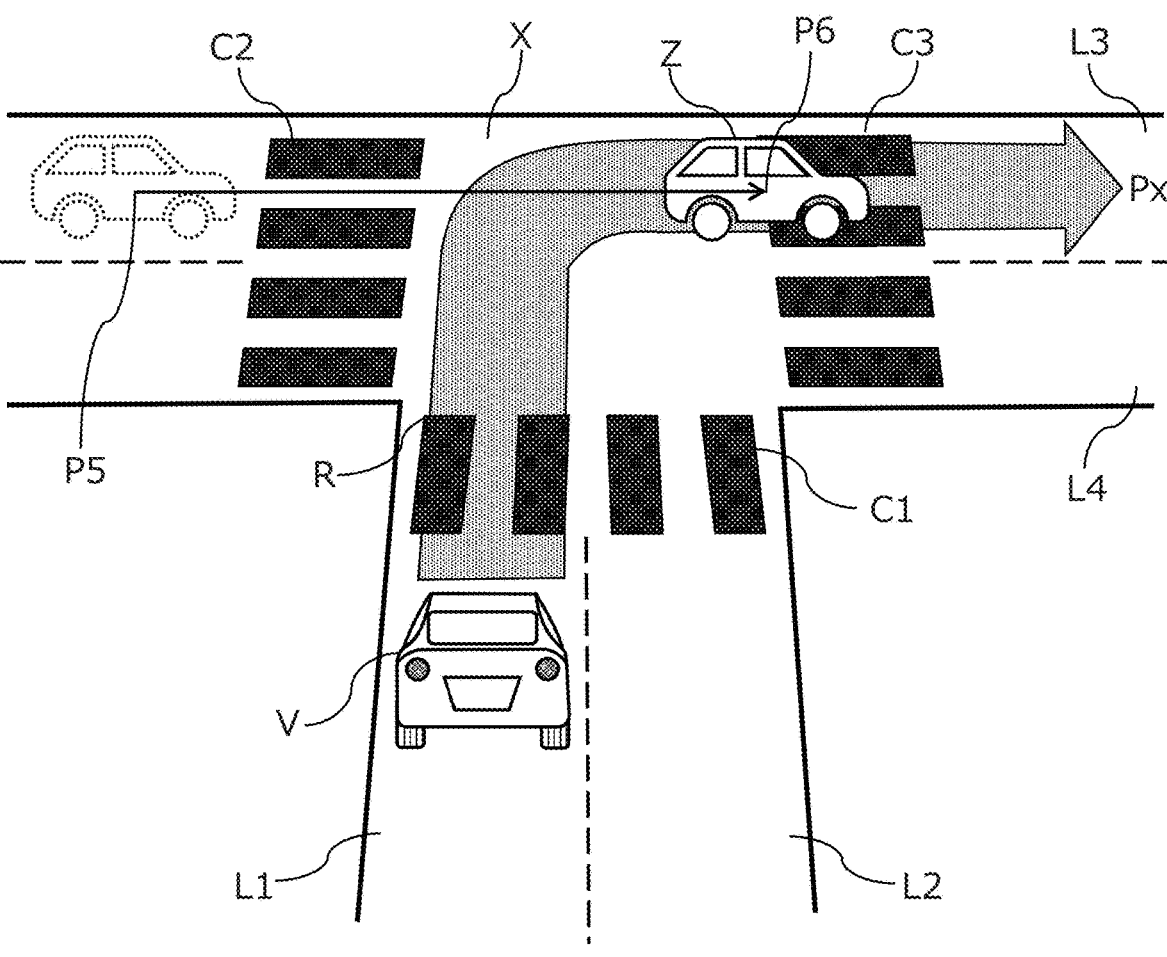
FIG. 2D is a diagram (part 4) illustrating an example of an image displayed when the driving assistance is executed by the driving assistance system illustrated in FIG. 1.

FIG. 2D illustrates an example of an image displayed on the display device 18 when the other vehicle Z makes a start and passes through the crosswalk C2, the intersection X, and the crosswalk C3. In the travel scene illustrated in FIG. 2D, the other vehicle Z makes a start from the position P5, travels straight through the intersection X, and travels to a position P6. It is assumed that the pedestrians Y1 and Y2 are walking outside the screen of the display device 18. In this case, the driving assistance device 19 recognizes, from the detection results of the imaging device 11 and ranging device 12, that the other vehicle Z is traveling at the position P6, and determines that the other vehicle Z has passed through the intersection X. Then, the driving assistance device detects obstacles present on the travel route R at the intersection X and crosswalks C1 and C3, and determines whether or not an obstacle is present at the intersection X or the crosswalk C1 or C3. In the travel scene illustrated in FIG. 2D, no object that could be an obstacle to the vehicle V is detected, and the driving assistance device 19 therefore determines that the vehicle V can pass through the intersection X. Accordingly, the driving assistance device 19 stops (hides) the display of the image I1 notified to the occupants of the vehicle V.

When determining that the vehicle V can pass through the intersection area, the driving assistance device 19 changes the display portion of the intersection area on the display device 18. Alternatively or in addition to this, the driving assistance device 19 displays and superimposes on the display portion of the intersection area an indication that the intersection area is passable. In the travel scene illustrated in FIG. 2D, for example, the driving assistance device 19 decreases the degree of emphasizing the display portion of the intersection X and displays and superimposes on the display portion of the intersection X an indication that the intersection X is passable. Alternatively or in addition to this, the driving assistance device 19 changes the color of the display portion of the travel route R. For example, the driving assistance device 19 changes the color of the display portion of the travel route R illustrated in FIG. 2D from dark hatching indicating an untravelable portion to light hatching indicating a travelable portion.

Figure 2E:
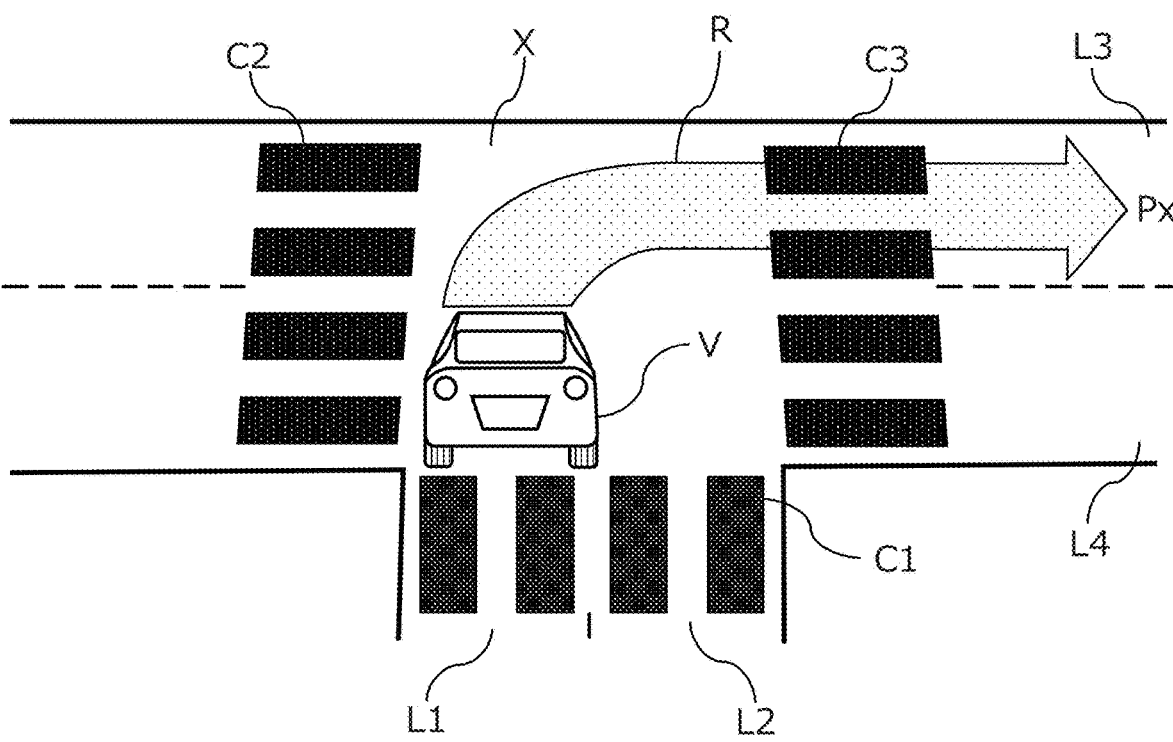
FIG. 2E is a diagram (part 5) illustrating an example of an image displayed when the driving assistance is executed by the driving assistance system illustrated in FIG. 1.

FIG. 2E illustrates an example of the travel route R with the color of the display portion changed. In the travel scene illustrated in FIG. 2E, the vehicle V makes a start from the stop position before the crosswalk C1 and enters the intersection X. The driving assistance device 19 uses the driving assistance function of the assistance unit 20 to drive the vehicle V along the travel route R. The vehicle V passes through the intersection X and the crosswalks C1 and C3 under the control by the drive device and steering device via the vehicle control device 17 and reaches the destination Px under the autonomous travel control.

<Processing in Driving Assistance System>

A procedure when the driving assistance device 19 processes information will be described with reference to FIGS. 3A to 3D. FIGS. 3A to 3D depict an example of a flowchart illustrating information processing executed in the driving assistance system 10 of the present embodiment. The processing described below is executed at predetermined time intervals by the CPU 191, which is a processor of the driving assistance device 19.

Figure 3A:
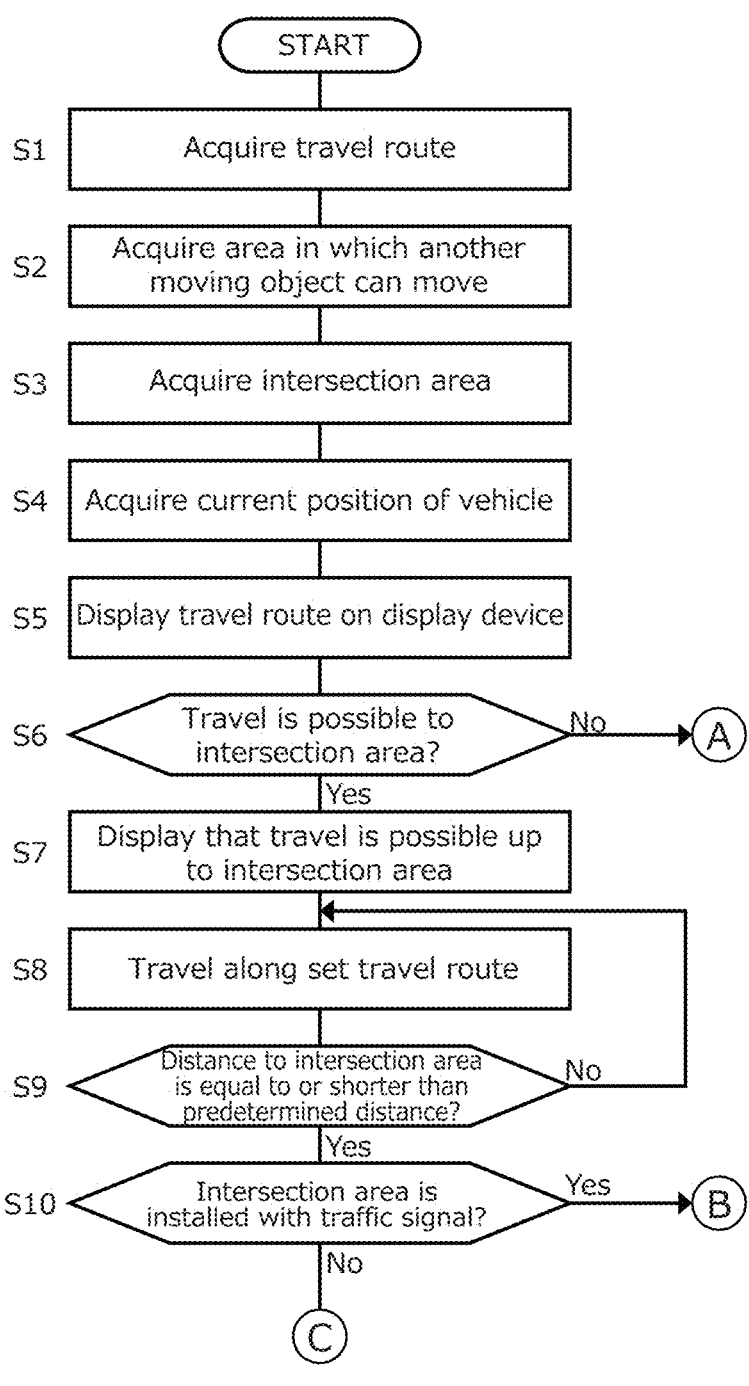
FIG. 3A is a flowchart (part 1) illustrating an example of a processing procedure in the driving assistance device of FIG. 1.

First, the intersection area acquisition function is used in step S1 of FIG. 3A to acquire the travel route R from the navigation device 16, in subsequent step S2 to acquire from the map information 14 the area in which other moving objects can move, and in subsequent step S3 to acquire the intersection area. Then, in step S4, the travel environment recognition function is used to acquire the current position of the vehicle V from the position detection device 15, and in subsequent step S5, the notification function is used to display the travel route R on the display device 18. Then, in step S6, a determination is made whether or not the vehicle V can travel to the intersection area by the autonomous travel control. When a determination is made that the vehicle V cannot travel to the intersection area by the autonomous travel control, such as when an unavoidable obstacle is present ahead of the vehicle V, execution of the routine is concluded and is shifted to manual driving by the driver. On the other hand, when a determination is made that the vehicle V can travel to the intersection area by the autonomous travel control, the process proceeds to step S7.

In step S7, the notification function is used to display on the display device 18 that the vehicle V can travel up to the intersection area, and in subsequent step S8, the driving assistance function is used to drive the vehicle V along the set travel route R. In step S9, a determination is made whether or not the distance from the vehicle V to the intersection area is equal to or less than a predetermined distance. When a determination is made that the distance from the vehicle V to the intersection area is longer than the predetermined distance, the process proceeds to step S8, in which the vehicle V continues to travel along the travel route R until the distance from the vehicle V to the intersection area becomes equal to or less than the predetermined distance. On the other hand, when a determination is made that the distance from the vehicle V to the intersection area is equal to or less than the predetermined distance, the process proceeds to step S10.

In step S10, the passage determination function is used to determine whether or not the intersection area is installed with a traffic light. When a determination is made that the intersection area is installed with a traffic light, the process proceeds to step S21 of FIG. 3B. On the other hand, when a determination is made that the intersection area is not installed with a traffic light, the process proceeds to step S51 of FIG. 3C. In the following description, it is assumed that the intersection area determined to be installed with a traffic light is the intersection X installed with crosswalks.

Figure 3B:
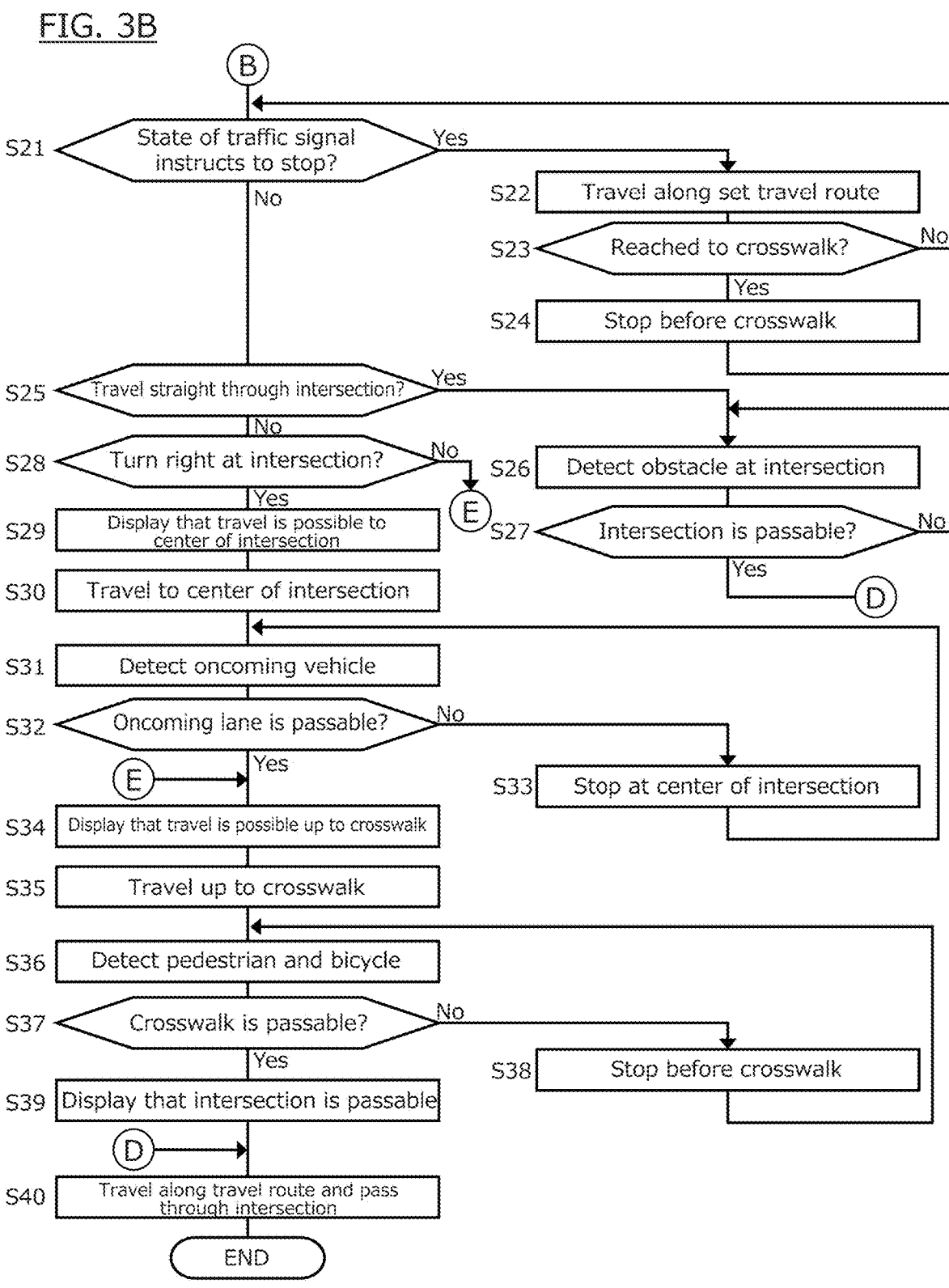
FIG. 3B is a flowchart (part 2) illustrating an example of a processing procedure in the driving assistance device of FIG. 1.

In step S10 of FIG. 3A, when a determination is made that the intersection area is installed with a traffic light, the process proceeds to step S21 of FIG. 3B. In step S21 of FIG. 3B, the passage determination function is used to determine whether or not the state of the traffic light instructs to make a stop. When a determination is made that the state of the traffic light instructs to make a stop, the process proceeds to step S22, in which the vehicle V is controlled to travel along the set travel route R. In subsequent step S23, a determination is made whether or not the vehicle V has reached a crosswalk. When a determination is made that the vehicle V has not reached the crosswalk, the process proceeds to step S21, in which the state of the traffic light is detected while continuing to travel along the travel route R. On the other hand, when a determination is made that the vehicle V has reached the crosswalk, the process proceeds to step S24, in which the vehicle V is stopped before the crosswalk. After that, the process proceeds to step S21, in which the state of the traffic light is detected.

When a determination is made in step S21 that the state of the traffic light does not instruct to make a stop, the process proceeds to step S25. In step S25, a determination is made whether or not the vehicle V travels straight through the intersection X. When a determination is made that the vehicle V travels straight through the intersection X, the process proceeds to step S26, in which an obstacle present at the intersection X is detected, and in subsequent step S27, a determination is made whether or not the vehicle V can pass through the intersection X. When a determination is made that the vehicle V can pass through the intersection X, the process proceeds to step S40, in which the vehicle V is controlled to travel along the travel route R and pass through the intersection X. On the other hand, when a determination is made that the vehicle V cannot pass through the intersection X, the process proceeds to step S26, in which the detection of an obstacle is repeated. When the vehicle V reaches the intersection X, the vehicle V is stopped before the intersection X.

On the other hand, when a determination is made in step S25 that the vehicle V does not travel straight through the intersection X, the process proceeds to step S28, in which a determination is made whether or not the vehicle V turns right at the intersection X. When a determination is made that the vehicle V turns right at the intersection X, the process proceeds to step S29. On the other hand, when a determination is made that the vehicle V does not turn right at the intersection X (i.e., turns left), the process proceeds to step S34.

In step S29, the notification function is used to display on the display device 18 that the vehicle V can travel to the center of the intersection X, and in subsequent step S30, the driving assistance function is used to drive the vehicle V to the center of the intersection X. In step S31, the travel environment recognition function is used to detect an oncoming vehicle from the detection results of the imaging device 11 and ranging device 12, and in subsequent step S32, a determination is made whether or not the oncoming lane is passable. When a determination is made that no oncoming vehicle is present and the oncoming lane is passable, the process proceeds to step S34. On the other hand, when a determination is made that an oncoming vehicle is present and the oncoming lane is not passable, the process proceeds to step S33, in which the vehicle V is stopped at the center of the intersection X. Then, the process proceeds to step S31, in which an oncoming vehicle is detected again.

When a determination is made that the oncoming lane is passable and the process proceeds to step S34, the notification function is used to display on the display device 18 that it is possible to travel up to a position before the crosswalk. In subsequent step S35, the vehicle V is controlled to travel up to the position before the crosswalk. In subsequent step S36, pedestrians and bicycles passing through the crosswalk are detected, and in step S37, a determination is made whether or not the crosswalk is passable. When a determination is made that there are no pedestrians or bicycles and the crosswalk is passable, the process proceeds to step S39, in which the display device 18 displays that the intersection X is passable, and then the process proceeds to step S40. On the other hand, when a determination is made that a pedestrian or a bicycle is present and the crosswalk is not passable, the process proceeds to step S38, in which the vehicle V is stopped at the position before the crosswalk. Then, the process proceeds to step S36, in which pedestrians and bicycles are detected again.

Figure 3C:
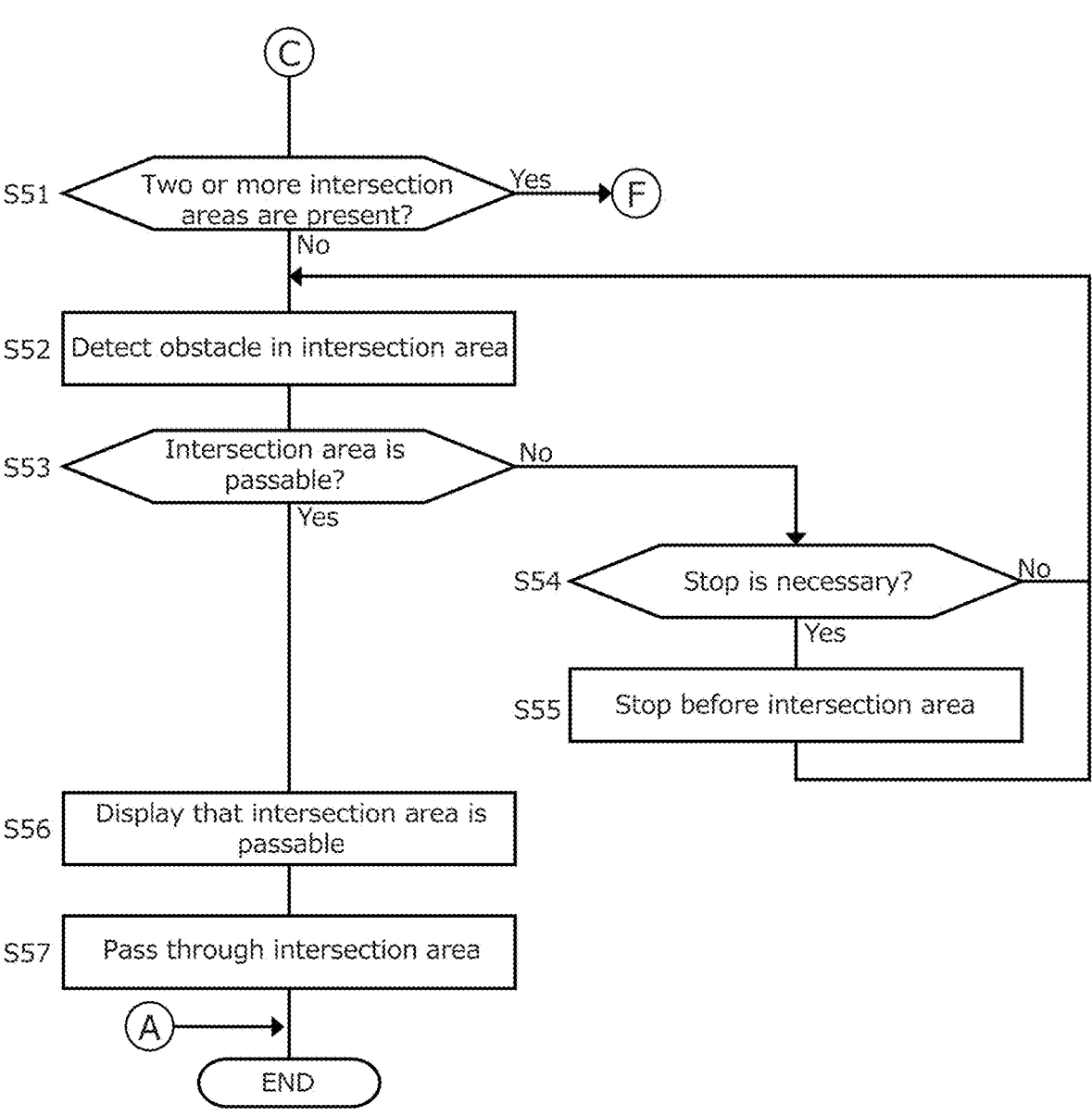
FIG. 3C is a flowchart (part 3) illustrating an example of a processing procedure in the driving assistance device of FIG. 1.

On the other hand, when a determination is made in step S10 of FIG. 3A that the intersection area is installed with no traffic light, the process proceeds to step S51 of FIG. 3C. In step S51 of FIG. 3C, the passage determination function is used to determine whether or not two or more intersection areas are present ahead of the vehicle V. When a determination is made that two or more intersection areas are present ahead of the vehicle V, the process proceeds to step S61 of FIG. 3D. On the other hand, when a determination is made that two or more intersection areas are not present ahead of the vehicle V, the process proceeds to step S52. In step S52, the travel environment recognition function is used to detect an obstacle present in the intersection area, and in subsequent step S53, the passage determination function is used to determine whether or not the intersection area is passable.

When a determination is made that the intersection area is passable, the process proceeds to step S56, in which the notification function is used to display on the display device 18 that the intersection area is passable, and in subsequent step S57, the driving assistance function is used to drive the vehicle V so that it passes through the intersection area. On the other hand, when a determination is made that the intersection area is not passable, the process proceeds to step S54, in which a determination is made whether or not it is necessary to make a stop before the intersection area. When a determination is made that it is not necessary to make a stop before the intersection area, the process proceeds to step S52, in which detection of obstacles is performed again. On the other hand, when a determination is made that it is necessary to make a stop before the intersection area, the process proceeds to step S55, in which the vehicle V is stopped before the intersection area, and the process proceeds to step S52.

Figure 3D:
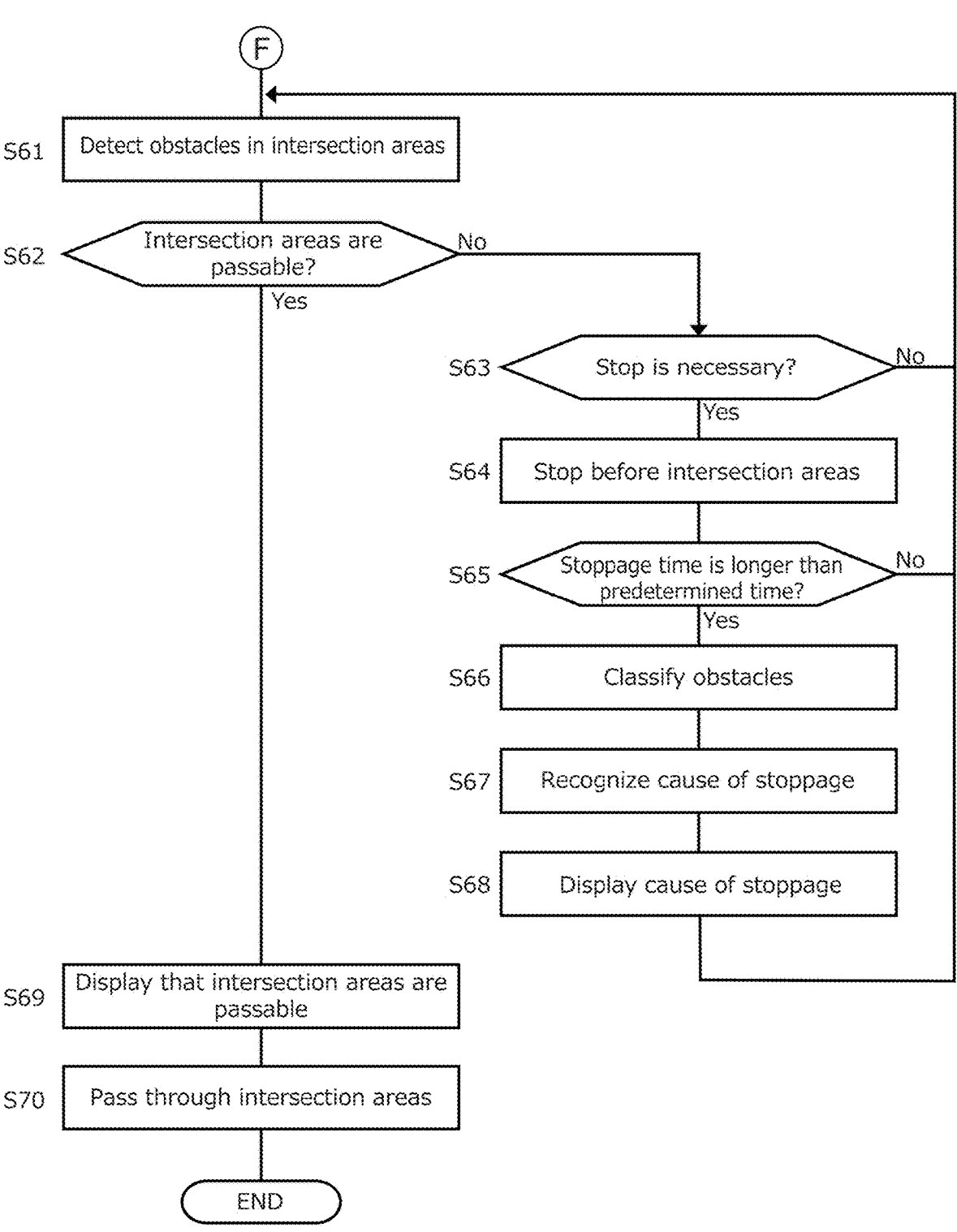
FIG. 3D is a flowchart (part 4) illustrating an example of a processing procedure in the driving assistance device of FIG. 1.

When a determination is made in step S51 of FIG. 3C that two or more intersection areas are present ahead of the vehicle V, the process proceeds to step S61 of FIG. 3D. In step S61 of FIG. 3D, the travel environment recognition function is used to detect obstacles present in the intersection areas, and in subsequent step S62, the passage determination function is used to determine whether or not the intersection areas are passable. When a determination is made that the intersection areas are passable, the process proceeds to step S69, in which the notification function is used to display on the display device 18 that the intersection areas are passable, and in subsequent step S70, the driving assistance function is used to drive the vehicle V so that it passes through the intersection areas.

On the other hand, when a determination is made that the intersection areas are not passable, the process proceeds to step S63, in which a determination is made whether or not it is necessary to make a stop before the intersection areas. When a determination is made that it is not necessary to make a stop, the process proceeds to step S61, in which the detection of obstacles is performed again. On the other hand, when a determination is made that it is necessary to make a stop, the process proceeds to step S64, in which the vehicle V is stopped before the intersection areas.

After the vehicle V is stopped before the intersection areas, the notification function is used in step S65 to determine whether or not the stoppage time of the vehicle V is longer than a predetermined time. When a determination is made that the stoppage time of the vehicle V is longer than the predetermined time, the process proceeds to step S66, in which the obstacles in the intersection areas are classified into stationary obstacles and other obstacles, and in subsequent step S67, the cause of stoppage is recognized, followed by step S68, in which the cause of stoppage is displayed on the display device 18. After that, the process proceeds to step S61, in which the detection of obstacles is performed again. On the other hand, when a determination is made that the stoppage time of the vehicle V is equal to or shorter than the predetermined time, the process directly proceeds to step S61, in which the detection of obstacles is performed again.

EMBODIMENTS OF PRESENT INVENTION

As described above, the present embodiment provides an information providing device comprising: an acquisition unit 21 configured to acquire an intersection area on a travel route R that is set by autonomous travel control, the intersection area intersecting with an area in which another moving object can move: a recognition unit 22 configured to recognize a travel environment around a vehicle V: a determination unit 23 configured to determine, based on the travel environment, whether or not the vehicle V can pass through the intersection area; and a notification unit 24 configured to notify an onboard terminal and/or an electronic terminal in the vehicle of a cause of the vehicle V being unable to pass through the intersection area when the determination unit 23 determines that the vehicle V cannot pass through the intersection area and a stoppage time of the vehicle V is longer than a predetermined time. This can suppress the anxious feeling which is given to the occupants until the vehicle V makes a start.

Moreover, according to the information providing device of the present embodiment, when notifying the cause using the display device 18, the notification unit 24 lowers the contrast of the display portion of the intersection area relative to the display portion of the travel route R and increases the degree of emphasizing the display portion of the cause. This allows the occupants of the vehicle V to intuitively perceive the cause of stoppage of the vehicle V.

Furthermore, according to the information providing device of the present embodiment, when the determination unit 23 determines that the vehicle V cannot pass through the intersection area, the notification unit 24 starts notification of the cause from a point of time when the stoppage time exceeds the predetermined time. This can suppress the uncomfortable feeling given to the occupants of the vehicle V due to an overemphasized display of the cause of stoppage of the vehicle V.

In addition, according to the information providing device of the present embodiment, when the determination unit 23 determines that the vehicle V can pass through the intersection area, the notification unit 24 changes the display portion of the intersection area on the display device 18 or displays and superimposes on the display portion of the intersection area an indication that the intersection area is passable. This allows the occupants of the vehicle V to intuitively perceive that the vehicle V can pass through the intersection area.

Moreover, according to the information providing device of the present embodiment, when notifying the cause using the display device 18, the notification unit 24 executes at least one of: lowering the contrast of a portion ahead of the intersection area in the display portion of the travel route relative to a display portion around the travel route: increasing the contrast of the display portion of the intersection area relative to the display portion of the travel route; and increasing the degree of emphasizing the display portion of the intersection area. This allows the occupants of the vehicle V to intuitively perceive the cause of stoppage of the vehicle V.

Furthermore, according to the information providing device of the present embodiment, when notifying the cause using the display device 18, the notification unit 24 executes at least one of: changing color of the display portion of the cause; and surrounding the display portion of the cause with a rectangle or a circle. This allows the occupants of the vehicle V to intuitively perceive the cause of stoppage of the vehicle V.

In addition, according to the information providing device of the present embodiment, when the cause is an obstacle, the recognition unit 22 classifies obstacles into stationary obstacles and other obstacles, and the notification unit 24 notifies the stationary obstacles and the other obstacles in different forms. This can prompt the occupants of the vehicle V to execute a driving operation to avoid stationary obstacles.

Moreover, according to the information providing device of the present embodiment, the notification unit 24 continues notification of the cause until the determination unit 23 determines that the vehicle V can pass through the intersection area. This can more reliably notify the occupants of the vehicle V of the cause of stoppage.

Furthermore, according to the information providing device of the present embodiment, when the cause is one of two or more causes, the determination unit 23 determines whether or not the vehicle V can pass through the intersection area for each of the causes, and the notification unit 24 continues notification of each cause in accordance with a determination result of the determination unit 23. This can notify each cause of stoppage.

In addition, according to the information providing device of the present embodiment, the notification unit 24 displays the cause on at least one of a display equipped in the vehicle V, a display included in a terminal for monitoring travel of the vehicle V, and a display on a terminal of an occupant of the vehicle V. This allows the cause of stoppage to be notified also to a person supervising the travel of the vehicle.

The present embodiment also provides an information providing method executed using a processor, wherein the processor is configured to: acquire an intersection area on a travel route R that is set by autonomous travel control, the intersection area intersecting with an area in which another moving object can move; recognize a travel environment around a vehicle V; determine, based on the travel environment, whether or not the vehicle V can pass through the intersection area; and notify an onboard terminal and/or an electronic terminal in the vehicle V of a cause of the vehicle V being unable to pass through the intersection area when determining that the vehicle V cannot pass through the intersection area and a stoppage time of the vehicle V is longer than a predetermined time. This can suppress the anxious feeling which is given to the occupants until the vehicle V makes a start.

DESCRIPTION OF REFERENCE NUMERALS

10 Driving assistance system
  11 Imaging device
  12 Ranging device
  13 State detection device
  14 Map information
  15 Position detection device
  16 Navigation device
  17 Vehicle control device
    171 Vehicle speed control device
    172 Steering control device
  18 Display device
  19 Driving assistance device (information providing device)
    191 CPU (processor)
    192 ROM
    193 RAM
20 Assistance unit
  21 Acquisition unit
  22 Recognition unit
  23 Determination unit
  24 Notification unit
C1, C2, C3 Crosswalk
I1, I2 Image
L1, L2, L3, L4 Lane

24

P1, P1a, P2, P3, P3a, P4, P5, P6 Position
Px Destination
R Travel route
V Vehicle (Subject vehicle)
X Intersection
Y1, Y2 Pedestrian
Z Another vehicle

The invention claimed is:

1. An information providing device comprising:
an acquisition unit configured to acquire an intersection area on a travel route, the intersection area intersecting with an area in which another moving object can move;
a recognition unit configured to recognize a travel environment around a vehicle;
a determination unit configured to determine, based on the travel environment, whether or not the vehicle can pass through the intersection area; and
a notification unit configured to notify an onboard terminal and/or an electronic terminal in the vehicle of a cause of the vehicle being unable to pass through the intersection area when the determination unit determines that the vehicle cannot pass through the intersection area,
wherein when notifying the cause using a display device, the notification unit lowers a contrast of a display portion of the intersection area relative to a display portion of the travel route and increases a degree of emphasizing a display portion of the cause.

2. The information providing device according to claim 1, wherein when the determination unit determines that the vehicle cannot pass through the intersection area, the notification unit starts notification of the cause from a point of time when the stoppage time exceeds the predetermined time.

3. The information providing device according to claim 1, wherein when the determination unit determines that the vehicle can pass through the intersection area, the notification unit changes a display portion of the intersection area on a display device or displays and superimposes on the display portion of the intersection area an indication that the intersection area is passable.

4. The information providing device according to claim 1, wherein when notifying the cause using a display device, the notification unit executes at least one of:
lowering a contrast of a portion ahead of the intersection area in a display portion of the travel route relative to a display portion around the travel route;
increasing the contrast of a display portion of the intersection area relative to the display portion of the travel route; and
increasing a degree of emphasizing the display portion of the intersection area.

5. The information providing device according to claim 1, wherein when notifying the cause using a display device, the notification unit executes at least one of:
changing color of a display portion of the cause; and
surrounding the display portion of the cause with a rectangle or a circle.

6. The information providing device according to claim 1, wherein when the cause is an obstacle, the recognition unit classifies obstacles into stationary obstacles and other obstacles, and the notification unit notifies the stationary obstacles and the other obstacles in different forms.

7. The information providing device according to claim 1, wherein the notification unit continues notification of the cause until the determination unit determines that the vehicle can pass through the intersection area.

8. The information providing device according to claim 7, wherein when the cause is one of two or more causes, the determination unit determines whether or not the vehicle can pass through the intersection area for each of the causes, and the notification unit continues notification of each cause in accordance with a determination result of the determination unit.

9. The information providing device according to claim 1, wherein the notification unit displays the cause on at least one of a display equipped in the vehicle, a display included in a terminal for monitoring travel of the vehicle, and a display on a terminal of an occupant of the vehicle.

10. An information providing method executed using a processor, wherein the processor is configured to:

acquire an intersection area on a travel route, the intersection area intersecting with an area in which another moving object can move;

recognize a travel environment around a vehicle;

determine, based on the travel environment, whether or not the vehicle can pass through the intersection area; and notify an onboard terminal and/or an electronic terminal in the vehicle of a cause of the vehicle being unable to pass through the intersection area when determining that the vehicle cannot pass through the intersection area; and when notifying the cause using a display device, lower a contrast of a display portion of the intersection area relative to a display portion of the travel route and increase a degree of emphasizing a display portion of the cause.

\* \* \* \* \*